(12) United States Patent
Mueck et al.

(10) Patent No.: US 9,008,581 B2
(45) Date of Patent: Apr. 14, 2015

(54) RADIO DEVICES AND METHODS FOR CONTROLLING RADIO DEVICES

(75) Inventors: Markus Mueck, Unterhaching (DE); Christian Drewes, Germering (DE); Christian Rom, Aalborg (DK); Wen Xu, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 937 days.

(21) Appl. No.: 12/614,440

(22) Filed: Nov. 8, 2009

(65) Prior Publication Data

US 2011/0111764 A1 May 12, 2011

(51) Int. Cl.
| | |
|---|---|
| H04B 1/00 | (2006.01) |
| H04W 72/00 | (2009.01) |
| H04W 24/00 | (2009.01) |
| H04W 72/08 | (2009.01) |
| H04M 1/725 | (2006.01) |
| H04W 8/00 | (2009.01) |
| H04W 28/18 | (2009.01) |

(52) U.S. Cl.
CPC ............ *H04W 72/085* (2013.01); *H04M 1/725* (2013.01); *H04M 2250/02* (2013.01); *H04M 2250/06* (2013.01); *H04W 8/005* (2013.01); *H04W 28/18* (2013.01)

(58) Field of Classification Search
CPC .................................................... H04W 28/18
USPC ..................... 455/67.11, 456; 370/67.11, 456
See application file for complete search history.

(56) References Cited

U.S. PATENT DOCUMENTS

| | | | |
|---|---|---|---|
| 7,277,409 B1 | 10/2007 | Thermond et al. | |
| 2002/0168943 A1* | 11/2002 | Callaway et al. | ............ 455/67.1 |
| 2002/0168992 A1* | 11/2002 | Eiden et al. | ................... 455/518 |
| 2003/0124979 A1* | 7/2003 | Tanada et al. | ................... 455/41 |
| 2004/0166812 A1* | 8/2004 | Lumelsky | ................... 455/67.11 |
| 2004/0203831 A1* | 10/2004 | Khan | ......................... 455/452.2 |

(Continued)

FOREIGN PATENT DOCUMENTS

| | | |
|---|---|---|
| CN | 1164807 A | 11/1997 |
| CN | 1221304 A | 6/1999 |

(Continued)

OTHER PUBLICATIONS

Markus Mueck et al.; "Smart Femto-Cell Controller Based Distributed Cognitive Pilot Channel"; 4th International Conference on Cognitive Radio Oriented Wireless Networks and Communications (CROWNCOM) 2009; Hannover, Germany; 5 pages.

(Continued)

*Primary Examiner* — Brandon Renner
(74) *Attorney, Agent, or Firm* — Schwabe, Wiliamson & Wyatt, P.C.

(57) ABSTRACT

In an embodiment, a radio device is provided. The radio device may include a signal transmitter configured to transmit a plurality of signals, the signals being transmitted with different intensities; a response receiver configured to receive a response message to one of the transmitted signals from a radio communication device having received the respective transmitted signal of the plurality of transmitted signals, the response message identifying the received message; and a assessment circuit configured to assess the reachability of the radio communication device from the radio device based on the intensity of the signal to which the radio communication device has responded.

17 Claims, 12 Drawing Sheets

(56) References Cited

U.S. PATENT DOCUMENTS

| | | | |
|---|---|---|---|
| 2005/0032534 | A1 | 2/2005 | Yoshizawa et al. |
| 2005/0260997 | A1* | 11/2005 | Korale et al. ............... 455/452.2 |
| 2005/0262216 | A1* | 11/2005 | Kashiwabara et al. ....... 709/208 |
| 2007/0002543 | A1* | 1/2007 | Nord ............................. 361/733 |
| 2007/0027925 | A1* | 2/2007 | Spencer et al. ............ 707/104.1 |
| 2007/0184852 | A1* | 8/2007 | Johnson et al. ............ 455/456.1 |
| 2007/0259690 | A1 | 11/2007 | Jullian et al. |
| 2008/0005351 | A1* | 1/2008 | Neugebauer et al. ......... 709/238 |
| 2008/0207226 | A1* | 8/2008 | Shen et al. ................. 455/456.6 |
| 2010/0257421 | A1* | 10/2010 | Kohno et al. ................. 714/748 |

FOREIGN PATENT DOCUMENTS

| | | | |
|---|---|---|---|
| CN | 1665229 | A | 9/2005 |
| CN | 1671243 | A | 9/2005 |
| JP | 2005142811 | A | 6/2005 |
| KR | 20010024192 | A | 3/2001 |
| KR | 2003-0027604 | | 4/2004 |
| KR | 20070057274 | A | 6/2007 |
| KR | 100740170 | B1 | 7/2007 |
| SE | 506689 | C2 | 2/1998 |
| WO | 2005013498 | A2 | 2/2005 |

OTHER PUBLICATIONS

R. Oliveira et al.; "Performance Analysis of IEEE 802.11 Distributed Coordination Function With Unicast and Broadcast Traffic"; 2006 IEEE Symposium on Personal, Indoor and Mobile Radio Communications; Sep. 11-14, 2006; pp. 1-5.

Tae-Hwan Kim et al.; "Throughput Enhancement of Macro and Femto Networks by Frequency Reuse and Pilot Sensing"; 2008 IEEE International Conference on Performance, Computing and Communications; Dec. 7-9, 2008; pagees 390-394.

Chinese Patent Office; First Office Action for Chinese App. No. 201010541727.2 issued Jan. 4, 2013; 12 pages of English translation.

Chinese Patent Office; Second Office Action for Chinese App. No. 201010541727.2 issued Sep. 26, 2013; 9 pages of English translation.

German Patent Office; Examination Report for German App. No. 102010060306.6, mailed Jun. 1, 2012; 10 pages.

South Korean Patent Office; Office Action for South Korean App. No. 2010-0110545 dated Feb. 20, 2012; 9 pages inclusive of English translation.

South Korean Patent Office; Office Action for South Korean App. No. 2012-0041298 dated Jun. 12, 2012; 5 pages inclusive of English translation.

South Korean Patent Office; Office Action for South Korean App. No. 2012-0151291 dated Feb. 18, 2013; 7 pages inclusive of English translation.

South Korean Patent Office; Office Action for South Korean App. No. 2012-0151291 dated Jun. 21, 2013; 5 pages inclusive of English translation.

South Korean Patent Office; Office Action for South Korean App. No. 2012-0151291 dated Aug. 13, 2013; 8 pages inclusive of English translation.

South Korean Patent Office; Office Action for South Korean App. No. 2013-0041946 dated Jun. 20, 2013; 5 pages inclusive of English translation.

South Korean Patent Office; Office Action for South Korean App. No. 2013-0041946 dated Dec. 13, 2013; 5 pages inclusive of English translation.

Jan-Hinrich Hauer et al.; "Experimental Study of the Impact of WLAN Interference on IEEE 802.15.4 Body Area Networks"; IEEE Proceedings of the 6th European Conference on Wireless Sensor Networks (EWSN); Feb. 2009; Cork, Ireland; 16 pages.

* cited by examiner

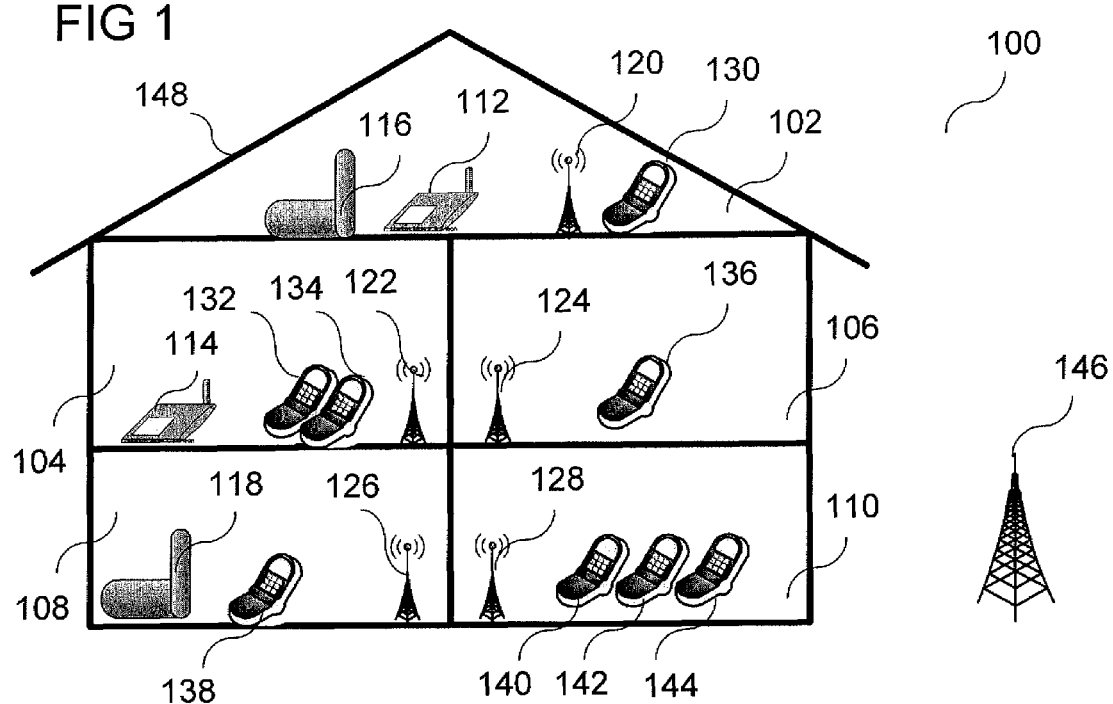
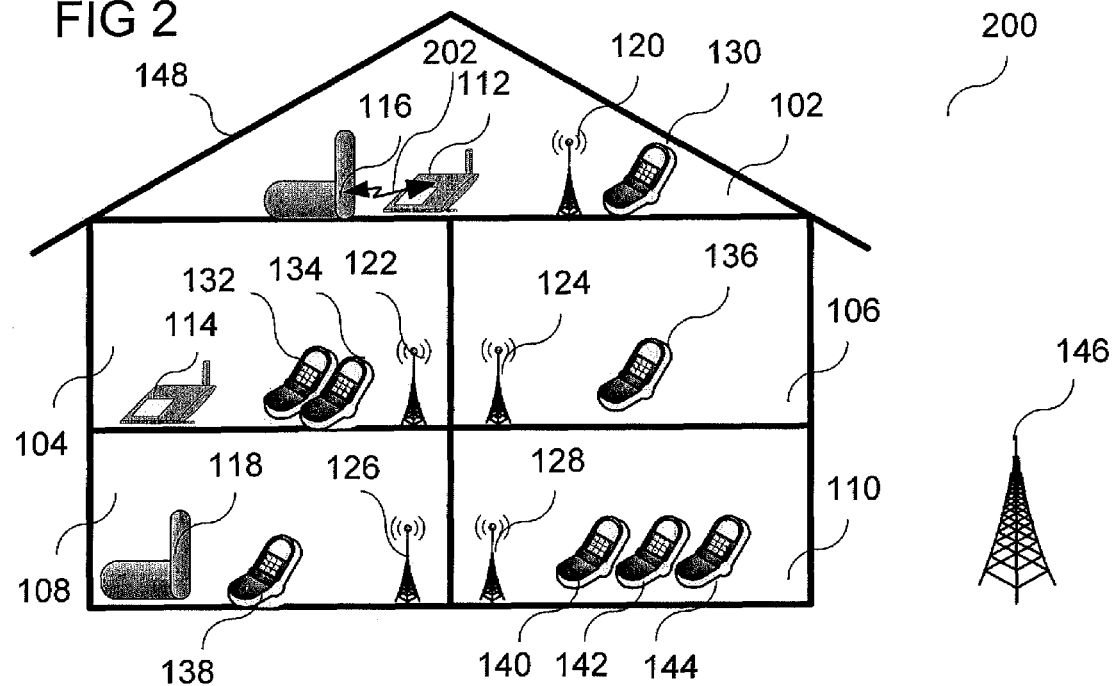

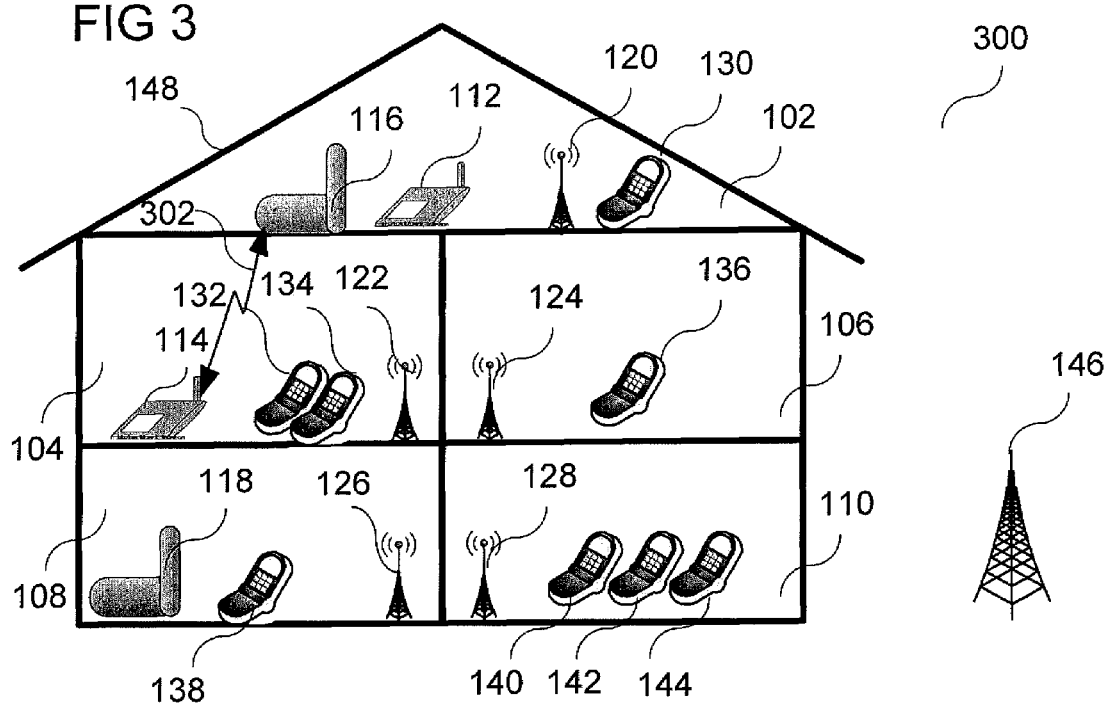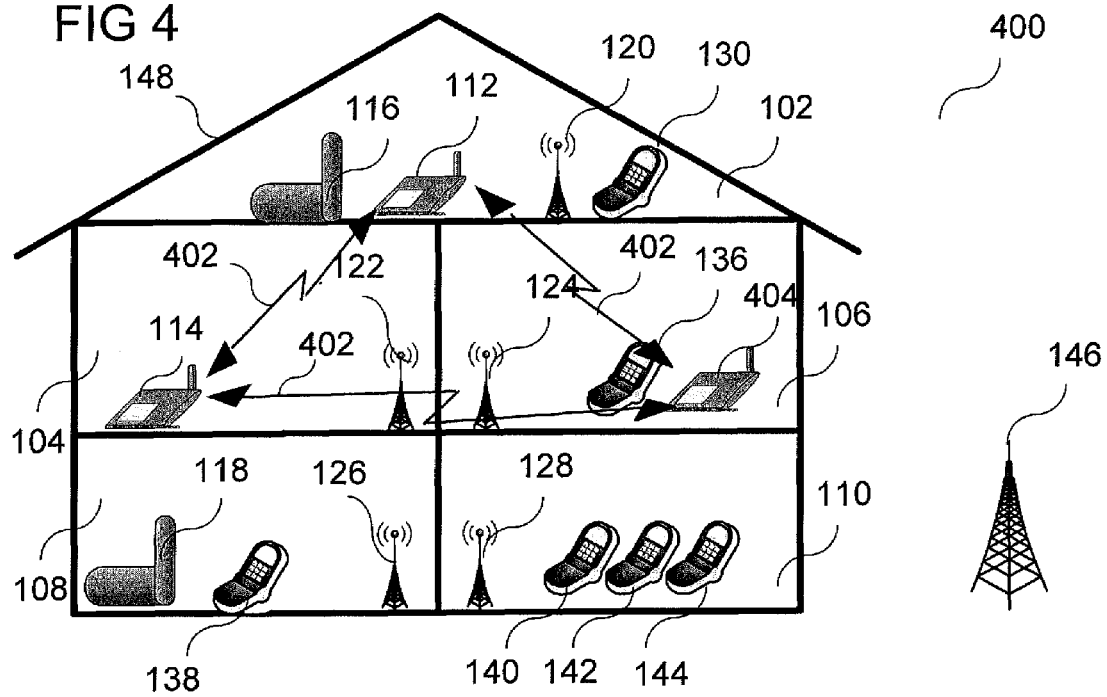

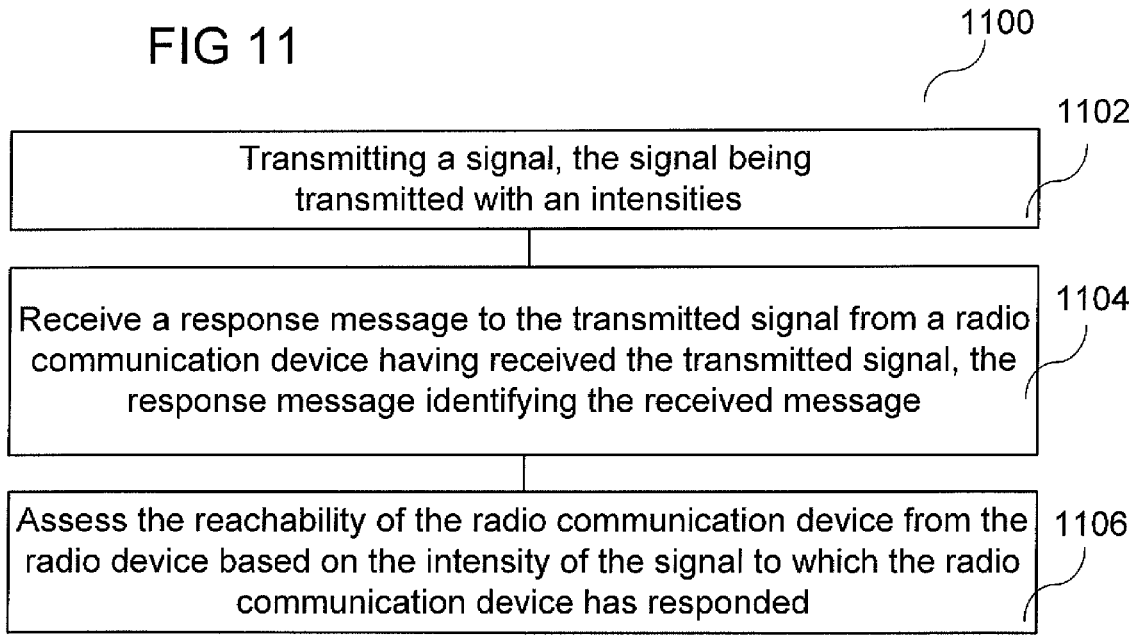
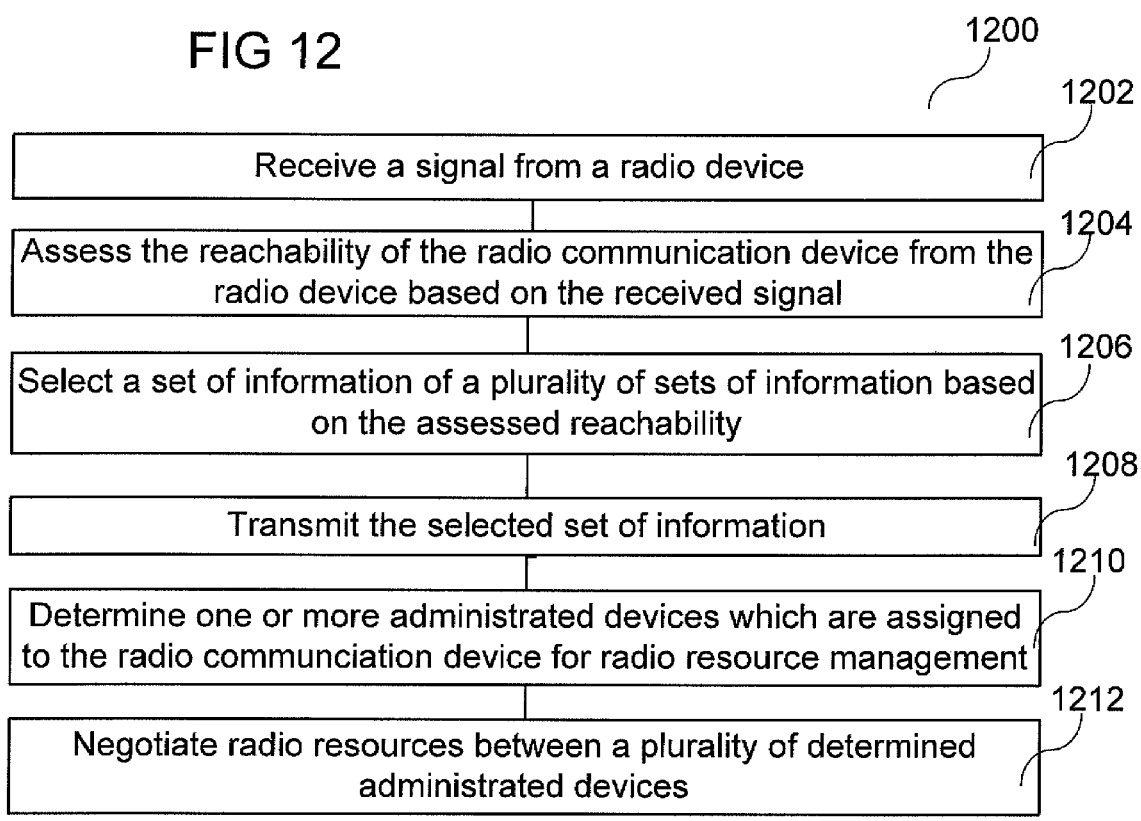

RADIO DEVICES AND METHODS FOR CONTROLLING RADIO DEVICES

TECHNICAL FIELD

Various embodiments relate generally to radio devices and methods for controlling radio devices.

BACKGROUND

In commonly used radio communication systems, multiple distinct radio systems may coexist. For example, one or more of the following radio systems or other radio systems may be present:

Femto-Cells: A Femto-Cell base station may be acting as a local base station (BS) providing cellular access to users;

WLAN (IEEE 802.11a/b/g/n/ac/ad based): A Wireless-LAN device may typically be operating in the 2.4 GHz band (or 5 GHz band). There may be a risk of interference with other systems like ZigBee;

ZigBee (IEEE 802.15.4 based): This Radio Access Technology (RAT) may typically be operating in the 2.4 GHz band. There may be a risk of interference with other systems like WLAN.

Parameterization "by hand" commonly is the only solution in order to ensure a limited level of interference within a radio communication system with multiple distinct radio systems.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a deployment scenario of radio systems in accordance with an embodiment;

FIG. 2 shows a deployment scenario of radio systems with intra home/office interference in accordance with an embodiment;

FIG. 3 shows a deployment scenario of radio systems with inter home/office interference in accordance with an embodiment;

FIG. 4 shows a deployment scenario of radio systems with inter home/office sharing of resources in accordance with an embodiment;

FIG. 11 shows a flow diagram illustrating a method for controlling a radio device (a wireless resource controller) in accordance with an embodiment;

FIG. 12 shows a flow diagram illustrating a method for controlling a radio device (a wireless resource controller) in accordance with an embodiment;

DESCRIPTION

Figure 5:
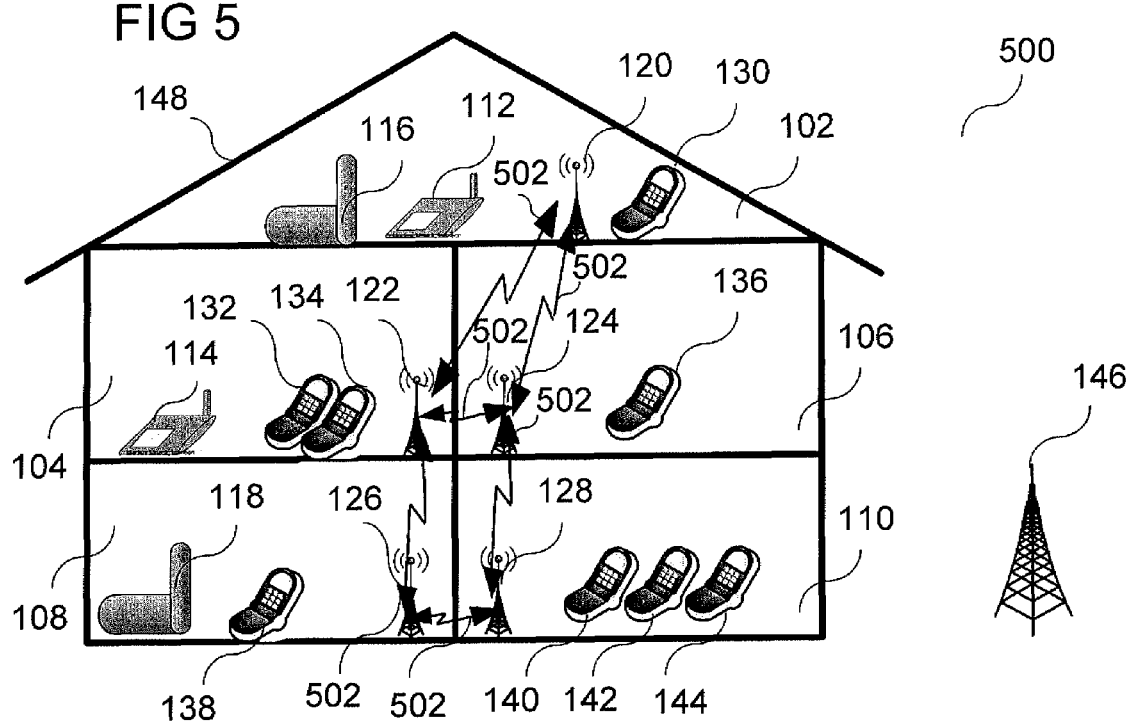
FIG. 5 shows a deployment scenario of radio systems with inter-home/office resource sharing in accordance with an embodiment.

In various embodiments, a radio device (wireless resource controller, WRC, as will be explained in more detail below) may be provided, to which one or more radio communication devices (for example one or more access points, one or more base stations, one or more WLAN radio access technologies (RATs), one or more ZigBee RATs, and/or one or more Blue-Tooth RATs) may be assigned. The wireless resource controllers may negotiate radio resources for the radio communication devices assigned to it with other wireless resource controllers. After having agreed on radio resources, the wireless resource controller may assign the radio resources it has agreed on with the other wireless resource controllers to the radio communication devices by interchanging information with a radio device (local resource controller, LRC, as will be explained in more detail below) in the radio communication device.

The following detailed description refers to the accompanying drawings that show, by way of illustration, specific details and embodiments in which the invention may be practiced. Other embodiments may be utilized and structural, logical, and electrical changes may be made without departing from the scope of the invention. The various embodiments are not necessarily mutually exclusive, as some embodiments can be combined with one or more other embodiments to form new embodiments. The following detailed description therefore, is not to be taken in a limiting sense, and the scope of the present invention is defined by the appended claims.

The word "exemplary" is used herein to mean "serving as an example, instance, or illustration". Any embodiment or design described herein as "exemplary" is not necessarily to be construed as preferred or advantageous over other embodiments or designs.

A radio communication device according to various embodiments may be a device configured for wireless communication. In various embodiments, a radio communication device may be an end-user mobile device (MD). In various embodiments, a radio communication device may be any kind of mobile telephone, personal digital assistant, mobile computer, or any other mobile device configured for communication with a mobile communication base station or an access point and may be also referred to as a User Equipment (UE). In various embodiments, a radio communication device may be a femto cell base station or a Home Node B base station. In various embodiments, advanced base stations (advanced BS, ABS) and advanced mobile stations (advanced MS, AMS) in accordance with IEEE 802.16m may be incorporated.

A radio device according to various embodiments may include a memory which is for example used in the processing carried out by the end-user mobile devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The terms "coupling" or "connection" are intended to include a direct "coupling" or direct "connection" as well as an indirect "coupling" or indirect "connection", respectively.

The term "protocol" is intended to include any piece of software that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

In various embodiments, the radio devices may be configured as a home base station, e.g. as a Home NodeB, e.g. as a Home (e) NodeB. In an example, a 'Home NodeB' may be understood in accordance with 3GPP (Third Generation Partnership Project) as a trimmed-down version of a cellular mobile radio base station optimized for use in residential or corporate environments (e.g., private homes, public restaurants or small office areas). In various examples throughout this description, the terms 'Home Base Station', 'Home NodeB', 'Home eNodeB', 'Femto Cell', 'Femto Cell Base Station' are referring to the same logical entity and will be used interchangeably throughout the entire description. Femto-Cell Base Stations (FC-BS) may be provided in accordance with a 3GPP standard, but may also be provided for any other mobile radio communication standard, for example for IEEE 802.16m.

The so-called 'Home Base Station' concept shall support receiving and initiating cellular calls at home, and uses a broadband connection (typically DSL (dynamic subscriber line), cable modem or fibre optics) to carry traffic to the operator's core network bypassing the macro network architecture (including legacy NodeBs or E-NodeBs, respectively), i.e. the legacy UTRAN (UMTS (Universal Mobile Telecommunications System) Terrestrial Radio Access Network) or E-UTRAN, respectively. Femto Cells shall operate with all existing and future handsets rather than requiring customers to upgrade to expensive dual-mode handsets or UMA (Unlicensed Mobile Access) devices.

From the customer's perspective, 'Home NodeBs' offer the user a single mobile handset with a built-in personal phonebook for all calls, whether at home or elsewhere. Furthermore, for the user, there is only one contract and one bill. Yet another effect of providing 'Home NodeBs' may be seen in the improved indoor network coverage as well as in the increased traffic throughput. Moreover, power consumption may be reduced as the radio link quality between a handset and a 'Home Base Station' may be expected to be much better than the link between a handset and legacy 'NodeB'.

In an embodiment, access to a 'Home NodeB' may be allowed for a closed user group only, i.e. the communication service offering may be restricted to employees of a particular company or family members, in general, to the members of the closed user group. This kind of 'Home Base Stations' may be referred to as 'Closed Subscriber Group Cells' (CSG Cells) in 3GPP. A mobile radio cell which indicates being a CSG Cell may need to provide its CSG Identity to the mobile radio communication terminal devices (e.g. the UEs). Such a mobile radio cell may only be suitable for a mobile radio communication terminal device if its CSG Identity is e.g. listed in the mobile radio communication terminal device's CSG white list (a list of CSG Identities maintained in the mobile radio communication terminal device or in an associated smart card indicating the mobile radio cells which a particular mobile radio communication terminal device is allowed to use for communication). In various embodiments, a home base station may be a consumer device that is connected to the mobile radio core network via fixed line (e.g. DSL) or wireless to a mobile radio macro cell. It may provide access to legacy mobile devices and increase the coverage in buildings and the bandwidth per user. In various embodiments, a home base station may be run in open or closed mode. In closed mode the home base station may provide access to a so-called closed subscriber group (CSG) only. Examples for such closed subscriber groups are families or some or all employees of a company, for example.

As a 'Femto Cell' entity or 'Home Base Station' entity will usually be a box of small size and physically under control of the user, in other words, out of the MNO's (mobile network operator) domain, it could be used nomadically, i.e. the user may decide to operate it in his apartment, but also in a hotel when he is away from home, e.g. as a business traveler. Additionally a 'Home NodeB' may be operated only temporarily, i.e. it can be switched on and off from time to time, e.g. because the user does not want to operate it over night or when he leaves his apartment.

Various embodiments are provided for devices, and various embodiments are provided for methods. It will be understood that basic properties of the devices also hold for the methods and vice versa. Therefore, for sake of brevity, duplicate description of such properties may be omitted.

In various embodiments, a (radio) resource of one or more (radio) resources will be understood as for example transmission frequency, transmission modulation scheme, transmission code, and/or transmission time slot, or any other feature of a transmitted signal.

FIG. 1 shows a deployment scenario 100 of radio systems in accordance with an embodiment, which represents an environment, in which multiple distinct radio systems may coexist. For example, the presence of the following radio systems may be considered (it will be understood that other systems may be straightforwardly included in this consideration):

Femto-Cells: A Femto-Cell (FC) base station (BS) may be acting as a local BS providing cellular access to users;

WLAN (IEEE 802.11a/b/g/n/ac/ad based): A Wireless-LAN device may typically be operating in the 2.4 GHz band (or 5 GHz band). There may be a risk of interference with other systems like ZigBee;

ZigBee (IEEE 802.15.4 based): This radio access technology (RAT) may typically be operating in the 2.4 GHz band. There may be a risk of interference with other systems like WLAN.

In the heterogeneous home/office scenario 100, a building 148 with several rooms 102, 104, 106, 108, 110 (in general with several portions of the building) is shown. Radio communication device, such as for example a femto cell base station, WLAN RAT (for example a WLAN access points, WLAN AP) or ZigBee RAT may be provided in each room (in general in each portion of the building). A first WLAN RAT 112, a first ZigBee RAT 116 and a first femto cell base station 120 may be provided in a first room 102. A second WLAN RAT 114 and a second femto cell base station 122 may be provided in a second room 104. A third femto cell base station 124 may be provided in a third room 106. A second ZigBee RAT 118 and a fourth femto cell base station 126 may be provided in a fourth room 108. A fifth femto cell base station 128 may be provided in a fifth room 110. In each of the rooms, further radio communication devices, such as end-user mobile devices (MD), such as user equipment (UE), may be operated. In the first room 102, a first MD 130 may be operated. In the second room 104, a second MD 132 and a third MD 134 may be operated. In the third room 106, a fourth MD 136 may be operated. In the fourth room 108, a fifth MD 138 may be operated. In the fifth room 110, a sixth MD 140, a seventh MD 142 and an eighth MD 144 may be operated. A radio base station 146, such as a macro cell base station, such as a legacy radio base station, may be provided outside the building 148.

FIG. 1 shows a typical usage scenario representing a typical heterogeneous multi-home/office context with each home/office operating a wireless system. In accordance with various embodiments, each of these systems may be managed by a distinct WRC.

Although FIG. 1 shows a deployment like it may be present in a home deployment or an office scenario, it is to be understood that the application of various embodiments is not restricted to such a scenario. Various embodiments may be applied whenever radio communication devices are present.

Although the scenarios given for various embodiments are home/office-centric, all embodiments and implementations may be straightforwardly extended to other contexts, like factory environments, etc.

According to various embodiments, suitable interference management mechanisms may be provided by introducing a radio device (a wireless resource controller (WRC)) in the homes/offices in order to address various types of intra-home/office and/or inter-home/office interference. Some interference scenarios are given in the sequel.

FIG. 2 shows a deployment scenario 200 of radio systems with intra home/office interference in accordance with an embodiment. The basic layout of the deployment scenario 200 is the same as in FIG. 1, and a repeated explanation thereof is omitted.

In the deployment scenario 200, the first WLAN RAT 112 and the first ZigBee RAT 116 may be operated within the same home/office, for example in room 102. They may be assumed to operate and interfere in the 2.4 GHz band, as indicated by arrow 202. Intra home/office interference between the first WLAN RAT 112 and the first ZigBee RAT 116 in the first room 102 may be present. As a consequence, the performance of both systems may be decreased.

FIG. 3 shows a deployment scenario 300 of radio systems with inter home/office interference in accordance with an embodiment. The basic layout of the deployment scenario 300 is the same as in FIG. 1, and a repeated explanation thereof is omitted.

In the deployment scenario 300, the second WLAN RAT 114 and the first ZigBee RAT 116 may be operated in distinct homes/offices, for example in distinct, but neighboring apartments, for example in the first room 102 and in the second room 104. They may be assumed to operate and interfere in the 2.4 GHz band, as indicated by arrow 302. Inter home/office interference between the second WLAN RAT 114 in the first room 102 and the first ZigBee RAT 116 in the second room 104 may be present. As a consequence, the performance of both systems may be decreased.

FIG. 4 shows a deployment scenario 400 of radio systems with inter home/office sharing of resources in accordance with an embodiment. The basic layout of the deployment scenario 400 is the same as in FIG. 1, and a repeated explanation thereof is omitted. In the third room 106, a third WLAN RAT 404 may be provided.

In the deployment scenario 400, multiple WLANs may be competing for the same spectrum. Multiple WLANs may be operated in distinct homes/offices (for example in distinct, but neighboring apartments). For example, the first WLAN RAT 116 in the first room 102, the second WLAN RAT 114 in the second room 104 and the third WLAN RAT 404 in the third room may be assumed to share the same frequency band for operation, as indicated by arrows 402. With a large enough number of WLANs, the system performance may decrease. In accordance with various embodiments, a framework of how to deal with such a situation may be provided.

FIG. 5 shows a deployment scenario 500 of radio systems with inter-home/office resource sharing in accordance with an embodiment. The basic layout of the deployment scenario 500 is the same as in FIG. 1, and a repeated explanation thereof is omitted.

In the deployment scenario 500, multiple Femto-Cell BS (serving as local cellular BS) may be operated in distinct homes/offices (for example in distinct, but neighboring apartments). The first femto-cell BS 120 in the first room 102, the second femto-cell BS 122 in the second room 104, the third femto-cell BS 124 in the third room 106, the fourth femto-cell BS 126 in the fourth room 108, and the fifth femto-cell BS 128 in the fifth room 110, may be assumed to share the same radio resources for operation, as indicated by arrow 502. With a large enough number of Femto-Cells, the available radio resources may be insufficient. Not enough resources may be available for all Femto-Cells. In various embodiments, a framework may be provided for how to deal with such a situation.

Various embodiments will address the various scenarios above and provide devices and methods for estimation and management of various types of interference, including the interference types illustrated above. Although the term "home/office" environment is used, all embodiments may be straightforwardly extended to other contexts, such as factory environments, etc.

Figure 6:
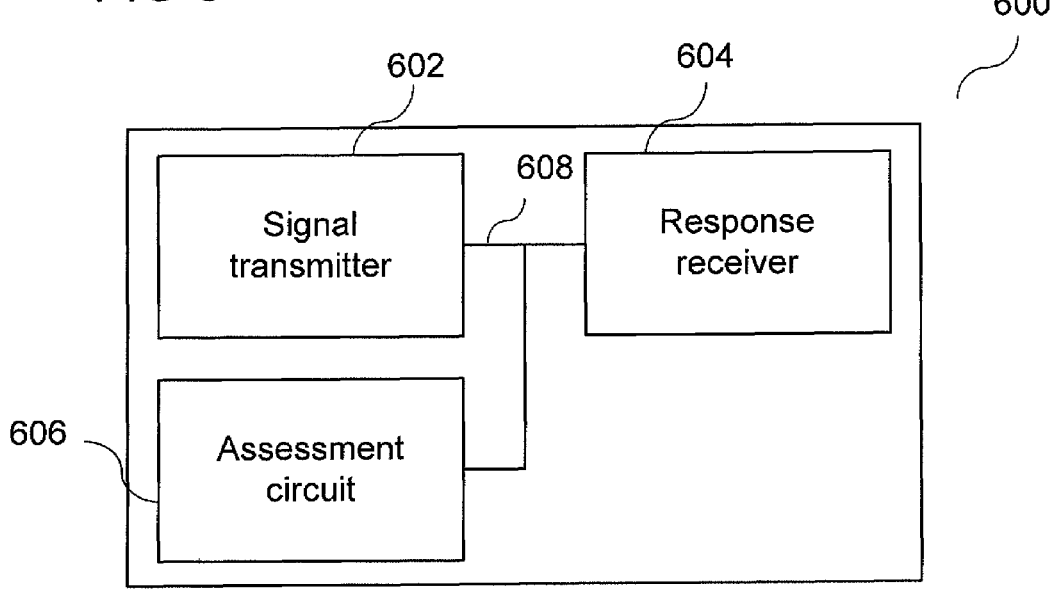
FIG. 6 shows a radio device (which may also be referred to as a wireless resource controller) in accordance with an embodiment.

FIG. 6 shows a radio device 600 (which may also be referred to as a wireless resource controller 600) in accordance with an embodiment. The radio device 600 may include a signal transmitter 602 configured to transmit a signal, the signal being transmitted with an intensity; a response receiver 604 configured to receive a response message to the transmitted signal from a radio communication device (not shown) having received the transmitted signal, the response message identifying the received message; and an assessment circuit 606 configured to assess the reachability of the radio communication device from the radio device 600 based on the intensity of the signal to which the radio communication device has responded. The signal transmitter 602, the response receiver 604 and the assessment circuit 606 may be coupled with each other, e.g. via an electrical connection 608 such as e.g. a cable or a computer bus or via any other suitable electrical connection to exchange electrical signals.

In various embodiments, reachability may include the distance (for example the geometric distance), the attenuation of signals, or any other metric for the positional relation between two devices. In various embodiments, reachability may include any metric involving any one of the distance (for example the geometric distance), the attenuation of signals, or any other metric for the positional relation between two devices.

In various embodiments, the signal transmitter 602 may be further configured to transmit a plurality of signals, the signals being transmitted with different intensities.

In various embodiments, the intensity of a signal may be understood as a transmission intensity, for example a transmission power of the transmitted signal.

In various embodiments, the intensity of a signal may be understood as representing a maximum number of hops, the signal may be relayed from a device receiving the signal and relaying the signal. It will be understood that in this case, information about the current hop count from the radio device 600 may be added to the relayed signal, increased by 1.

In various embodiments, the signal transmitter 602 may further be configured to provide the signals with distinguishing features for distinguishing the intensities of the respective transmitted signals.

In various embodiments, the distinguishing features may include at least one of the following features: a transmission time of the respective signal (i.e. the point of time a signal is transmitted; signals with different intensities may be transmitted at different points of time in order to be distinguishable); a transmission duration of the respective signal (i.e. the duration during which a signal is transmitted; signals with different intensities may be transmitted for time intervals of different lengths in order to be distinguishable); a transmission frequency of the respective signal; a code transmitted with the respective signal; and a Gold code, as will be explained in more detail below, transmitted with the respective signal.

In various embodiments, the signal transmitter 602 may further be configured to transmit signals by broadcast.

In various embodiments, the signal transmitter 602 may further be configured to transmit signals by broadcast on a dedicated channel.

In various embodiments, the transmitted signal may include an identifier of the radio device 600.

In various embodiments, the signal transmitter 602 may be further configured to transmit signals according to at least one radio communication technology of one of the following radio communication technology families:
  a Short Range radio communication technology family;
  a Metropolitan Area System radio communication technology family;
  a Cellular Wide Area radio communication technology family;
  a radio communication technology family which includes a radio communication technology in which the access to radio resources is provided in a random manner; and
  a radio communication technology family which includes a radio communication technology in which the access to radio resources is provided in a centrally controlled manner.

In various embodiments, the signal transmitter 602 may be further configured to transmit signals according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), e.g. IEEE 802.11ac for VHT below 6 GHz and IEEE 802.11 ad for VHT at 60 GHz, a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, and Unlicensed Mobile Access (UMA, also referred to as also referred to as 3GPP Generic Access Network, or GAN standard)).

In various embodiments, the response message may be a message according to at least one radio communication technology of one of the following radio communication technology families:
- a Short Range radio communication technology family;
- a Metropolitan Area System radio communication technology family;
- a Cellular Wide Area radio communication technology family;
- a radio communication technology family which includes a radio communication technology in which the access to radio resources is provided in a random manner; and
- a radio communication technology family which includes a radio communication technology in which the access to radio resources is provided in a centrally controlled manner.

In various embodiments, the response message may be a message according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), e.g. IEEE 802.11ac for VHT below 6 GHz and IEEE 802.11ad for VHT at 60 GHz, a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, and Unlicensed Mobile Access (UMA, also referred to as also referred to as 3GPP Generic Access Network, or GAN standard)).

In various embodiments, the response message may be identical to a message transmitted by a signal of the plurality of signals.

In various embodiments, the response message may be different from a message transmitted by a signal of the plurality of signals.

In various embodiments, the response message may include an identifier of the received signal.

In various embodiments, the response message may include an identifier of the radio communication device.

In various embodiments, the radio device 600 may further include a radio communication device identification circuit (not shown) configured to identify the radio communication device based on the response message.

In various embodiments, the assessment circuit 606 may further be configured to assess that the reachability of the radio communication device from the radio device 600 is less than a pre-determined reachability, if a response to a signal transmitted with a pre-determined intensity is received.

In various embodiments, the assessment circuit 606 may further be configured to assess that the reachability of the radio communication device from the radio device 600 is higher than a pre-determined reachability, if a response to a signal transmitted with a pre-determined intensity is not received.

In various embodiments, the assessment circuit 606 may further be configured to assess that the reachability of the radio communication device from the radio device 600 is less than a pre-determined first reachability and higher than a pre-determined second reachability, if a response to a signal transmitted with a pre-determined first intensity is received and a response to a signal transmitted with a pre-determined second intensity is not received.

In various embodiments, the radio device 600 may be configured to communicate with another radio device of the same type as the radio device 600 as a radio communication device. In other words, the radio communication device may be of the same type as the radio device 600.

Figure 7:
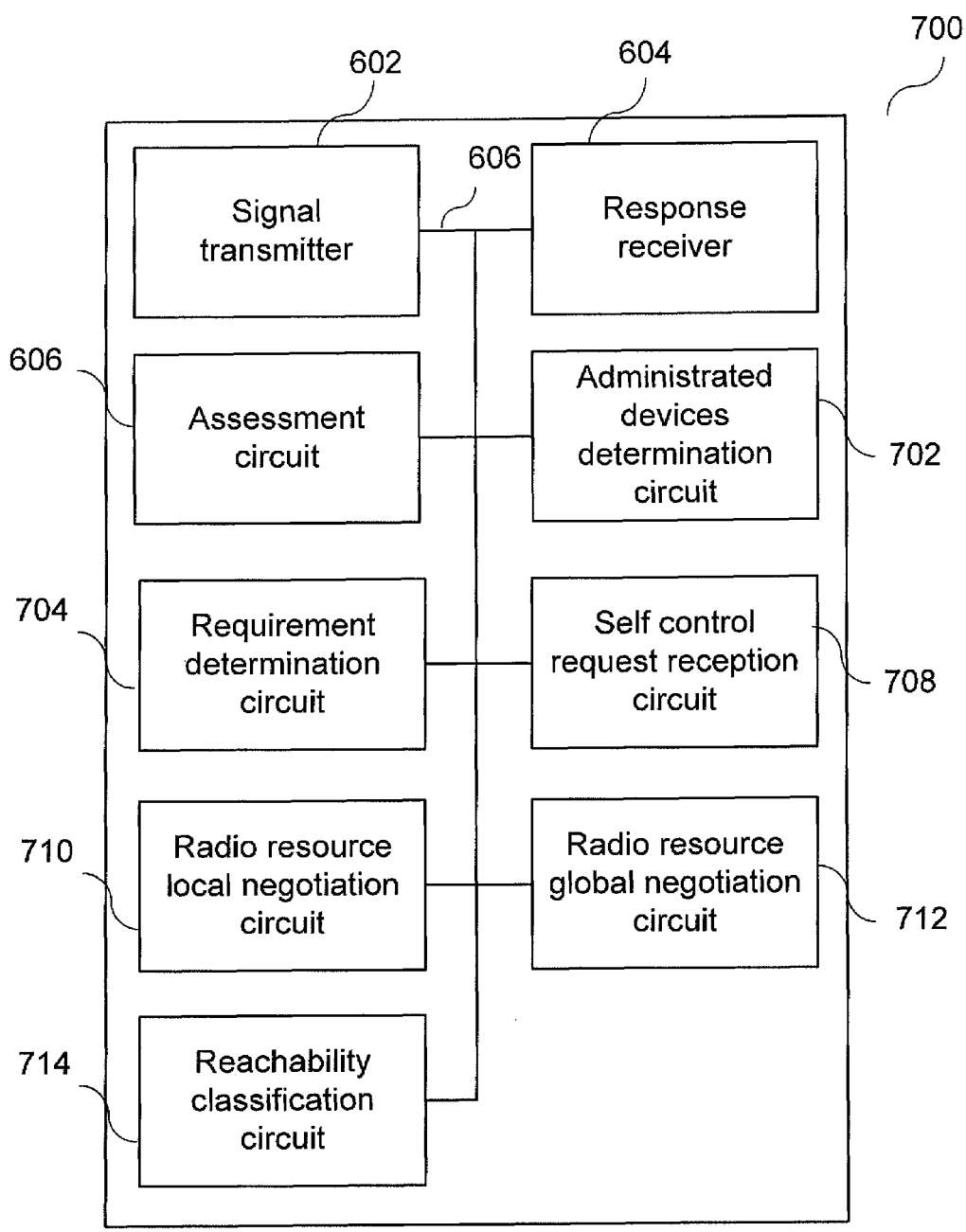
FIG. 7 shows a radio device (which may also be referred to as a wireless resource controller) in accordance with an embodiment.

FIG. 7 shows a radio device 700 (which may also be referred to as a wireless resource controller (WRC)) in accordance with an embodiment.

The radio device 700 may, similar to the radio device 600 of FIG. 6, include a signal transmitter 602 configured to transmit a signal, the signal being transmitted with an intensity; a response receiver 604 configured to receive a response message to the transmitted signal from a radio communication device (not shown) having received the transmitted signal, the response message identifying the received message; and an assessment circuit 606 configured to assess the reachability of the radio communication device from the radio device 700 based on the intensity of the signal to which the radio communication device has responded. The radio device 700 may further include an administrated devices determination circuit 702 as will be explained in more detail below. The radio device 700 may further include a requirement determination circuit 704 as will be explained in more detail below. The radio device 700 may further include a self control request reception circuit 708 as will be explained in more detail below. The radio device 700 may further include a radio resource local negotiation circuit 710 as will be explained in more detail below. The radio device 700 may further include a radio resource global negotiation circuit 712 as will be explained in more detail below. The radio device 700 may further include reachability classification circuit 714 as will be explained in more detail below. The signal transmitter 602, the response receiver 604, the assessment circuit 606, the administrated devices determination circuit 702, the requirement determination circuit 704, the self control request reception circuit 708, the radio resource local negotiation circuit 710, the radio resource global negotiation circuit 712 and the reachability classification circuit 714 may be coupled with each other, e.g. via an electrical connection 608 such as e.g. a cable or a computer bus or via any other suitable electrical connection to exchange electrical signals.

In various embodiments, reachability may include the distance (for example the geometric distance), the attenuation of signals, or any other metric for the positional relation between two devices. In various embodiments, reachability may include any metric involving any one of the distance (for example the geometric distance), the attenuation of signals, or any other metric for the positional relation between two devices.

In various embodiments, the signal transmitter 602 may be further configured to transmit a plurality of signals, the signals being transmitted with different intensities.

In various embodiments, the administrated devices determination circuit 702 may be configured to determine one or more administrated devices which are assigned to the radio device 700 for radio resource management, as will be explained in more detail below.

In various embodiments, the requirement determination circuit 704 may be configured to determine a requirement of a determined administrated device.

In various embodiments, the requirement may include a requirement of at least one of the following: a required quality of service; a required current quality of service; a required future quality of service; a required transmission rate; a required current transmission rate; a required future transmission rate; a required reception rate; a required current reception rate; a required future reception rate; a required transmission and reception rate; a required current transmission and reception rate; a required future transmission and reception rate; a required data transmission volume; a required data reception volume; a required data transmission and reception volume; a desired radio resource; a desired current radio resource; a desired future radio resource; and information indicating whether interference is allowed or not; information indicating whether interference is currently allowed or not; and information indicating whether interference will be allowed in the future or not.

In various embodiments, the self control request reception circuit 708 may be configured to receive a self control request from an administrated device indicating that the administrated device requests to control itself.

In various embodiments, the radio device 700 may further include a property determination circuit (not shown) configured to determine a property of a determined administrated device.

In various embodiments, the property may include at least one of the following: capability of radio resources; used radio resources; currently used radio resources; future used radio resources; and requirements of one or more terminals connected to the administrated device. In various embodiments, the requirements of the one or more terminals connected to the administrated device may include at least one of the following: a required quality of service; a required current quality of service; a required future quality of service; a required transmission rate; a required current transmission rate; a required future transmission rate; a required reception rate; a required current reception rate; a required future reception rate; a required transmission and reception rate; a required current transmission and reception rate; a required future transmission and reception rate; a required data transmission volume; a required data reception volume; a required data transmission and reception volume; a desired radio resource; a desired current radio resource; a desired future radio resource; information indicating whether interference is allowed or not; information indicating whether interference is currently allowed or not; and information indicating whether interference will be allowed in the future or not.

In various embodiments, the radio resource local negotiation circuit 710 may be configured to negotiate radio resources between a plurality of determined administrated devices.

In various embodiments, the radio resource local negotiation circuit 710 may be further configured to not negotiate radio resources for an administrated device from which a self control request has been received.

In various embodiments, the radio resource global negotiation circuit 712 may be further configured to negotiate radio resources for an administrated device with the radio communication device.

In various embodiments, the radio resource global negotiation circuit 712 may be further configured to negotiate radio resources for an administrated device with the radio communication device based on the assessed reachability of the radio communication device from the radio device 700.

In various embodiments, the radio resource local negotiation circuit 710 may further be configured to negotiate radio resources between a plurality of determined administrated devices based on the negotiation of the radio resource global negotiation circuit 712.

In various embodiments, the reachability classification circuit 714 may be configured to classify a plurality of radio communication devices according to the respective assessed reachability of the respective radio communication device into reachability classes.

In various embodiments, the radio resource global negotiation circuit 712 may be further configured to negotiate radio resources based on the reachability classes of the radio communication devices.

In various embodiments, the reachability classification circuit 714 may further be configured to classify the plurality of radio communication devices into two reachability classes according to the respective assessed reachability of the respective radio communication device.

In various embodiments, the reachability classification circuit 714 may further be configured to classify a radio communication device with an assessed reachability below a pre-determined threshold into a first reachability class, and to classify a radio communication device with an assessed reachability above a pre-determined threshold into a second reachability class.

In various embodiments, the radio resource global negotiation circuit 712 may further be configured to negotiate radio resources for an administrated device with the radio communication device in the first reachability class on an exclusive usage level. Exclusive usage level is to be understood in a way of negotiating the assignment of radio resources in a way that each radio resource is used by only one radio communication device or by the radio device 700.

In various embodiments, a global pool (or a global set) of resources may be assigned to the radio devices.

In various embodiments, the radio resource global negotiation circuit 712 may further be configured to negotiate radio resources for an administrated device with the radio communication device in the first reachability class on a radio resource negotiation level. In various embodiments, radio resources may be negotiated independent of transmission power, i.e. once the radio device 700 or a radio communication device has been assigned radio resources, the radio resources may be used without transmission power restriction.

In various embodiments, the radio resource global negotiation circuit 712 may further be configured to negotiate radio resources for an administrated device with the radio communication device in the second reachability class on an concurrent usage level.

In various embodiments, the radio resource global negotiation circuit 712 may further be configured to negotiate radio resources for an administrated device with the radio communication device in the second reachability class on a transmission energy negotiation level.

In various embodiments, the radio resource global negotiation circuit 712 may further be configured to negotiate radio resources for an administrated device with the radio communication device in the second reachability class on an interference avoidance level.

In various embodiments, the radio resource global negotiation circuit 712 may further be configured to, in case interference avoidance is not possible, negotiate radio resources for an administrated device with the radio communication device in the second reachability class on an interference minimization level.

In various embodiments, when negotiation is not successful for a radio communication device of the second class, the radio communication device of the second class may be re-classified to be in the first class.

In various embodiments, the negotiated resources may include at least one of the following: transmission power; frequency; modulation; and time slot.

In various embodiments, the radio device 700 may be configured to communicate with another radio device of the same type as the radio device 700 as a radio communication device. In other words, the radio communication device may be of the same type as the radio device 700.

Figure 8:
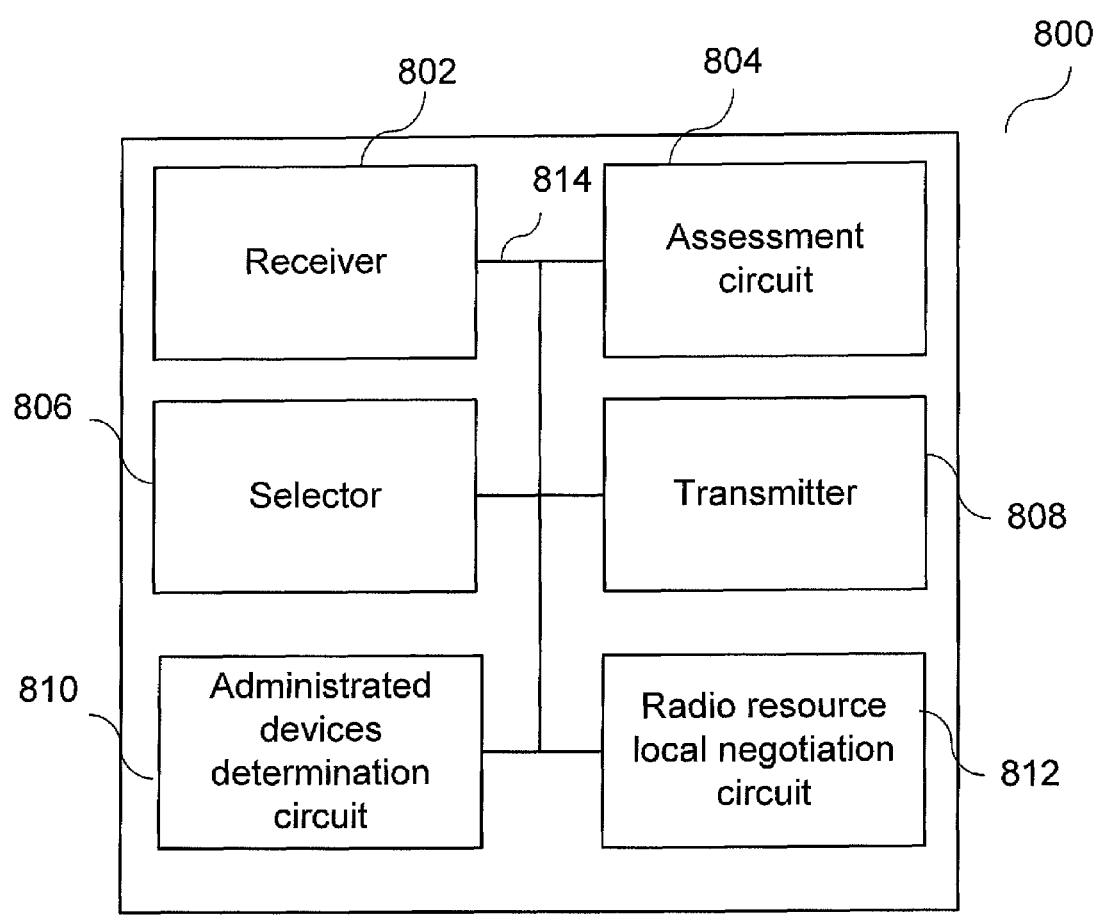
FIG. 8 shows a radio communication device (which may also be referred to as a wireless resource controller) in accordance with an embodiment.

FIG. 8 shows a radio communication device 800 (which may also be referred to as a wireless resource controller) in accordance with an embodiment. The radio communication device 800 may include a receiver 802, configured to receive a signal from a radio device (not shown in FIG. 8); an assessment circuit 804 configured to assess the reachability of the radio communication device 800 from the radio device based on the received signal; a selector 806 configured to select a set of information of a plurality of sets of information based on the assessed reachability; a transmitter 808 configured to transmit the selected set of information to the radio device; an administrated devices determination circuit 810 configured to determine one or more administrated devices which are assigned to the radio communication device for radio resource management; and a radio resource local negotiation circuit 812 configured to negotiate radio resources between a plurality of determined administrated devices. The receiver 802, the assessment circuit 804, the selector 806, the transmitter 808, the administrated devices determination circuit 810, and the radio resource local negotiation circuit 812 may be coupled with each other, e.g. via an electrical connection 814 such as e.g. a cable or a computer bus or via any other suitable electrical connection to exchange electrical signals.

In various embodiments, the administrated devices determination circuit 810 of the radio communication device 800 may be configured according to the administrated devices determination circuit 702 of the radio device 700.

In various embodiments, the radio resource local negotiation circuit 812 of the radio communication device 800 may be configured according to the radio resource local negotiation circuit 710 of the radio device 700.

In various embodiments, the radio communication device 800 may include any other property, feature or sub-device described with reference to the radio device 600 of FIG. 6 or the radio device 700 of FIG. 7.

In various embodiments, two or more wireless resource controllers, which for example may be configured according to the radio device 600 (or the radio device 700) and at the same time may be configured according to the radio communication device 800, may communicate. In various embodiments, those two or more devices may be of the same type, i.e. of the same configuration.

Figure 9:
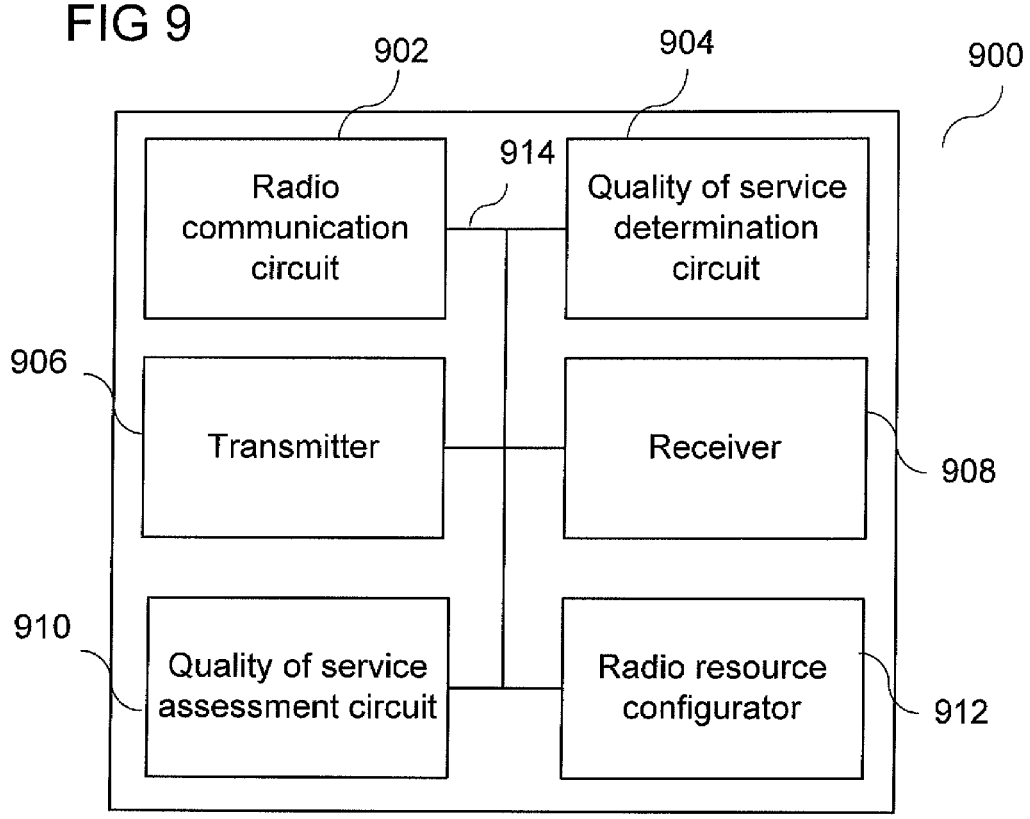
FIG. 9 shows a radio device (which may also be referred to as a local resource manager device) in accordance with an embodiment.

FIG. 9 shows a radio device 900 (which may also be referred to as a local resource manager device or local resource controller (LRC)) in accordance with an embodiment. The radio device 900 may include a radio communication circuit 902; a quality of service determination circuit 904 configured to determine quality of service information indicating quality of service requirements of the radio communication circuit 902; a transmitter 906 configured to transmit the determined quality of service information to a wireless resource controller (not shown; the wireless resource controller may be a radio device (wireless resource controller), like the radio device 600 shown in FIG. 6 or the radio device 700 shown in FIG. 7); a receiver 908 configured to receive radio resource management information from the wireless resource controller; a quality of service assessment circuit 910 configured to assess whether the quality of service requirements can be satisfied using the radio resource management information; and a radio resource configurator 912 configured to configure the radio communication circuit 902 based on the assessment and based on the received radio resource management information.

In various embodiments, the radio resource management information may represent configuration information for the radio device, for example radio resources assigned to the radio device or an algorithm to be applied in the radio device.

In various embodiments, the LRC 900 may be provided in an administrated device, as explained above.

In various embodiments, the receiver 908 may be further configured to receive packets and identify a packet including radio management information based on the header of the packet.

In various embodiments, the receiver 908 may be further configured to receive packets and identify a packet including radio management information based on the content of the packet.

In various embodiments, the receiver 908 may be further configured to exclusively receive radio management information.

In various embodiments, the radio resource management information may include information specifying radio resources assigned to the radio device 900.

In various embodiments, the radio resource management information may include context information representing the radio context of the radio device 900.

In various embodiments, the radio device 900 may further include a radio resource information determination circuit (not shown) configured to determine information specifying radio resources assigned to the radio device 900 based on the context information.

In various embodiments, the radio resource configurator 912 may further be configured to assign radio resources based on the received radio resource management information, if the quality of service assessment circuit 910 assesses that the quality of service requirements can be satisfied.

In various embodiments, the radio resource configurator 912 may further be configured to not assign radio resources, if the quality of service assessment circuit 910 assesses that the quality of service requirements cannot be satisfied. In various embodiments, a further negotiation may be carried out by the radio device 900, instead.

In various embodiments, the quality of service requirements may include at least one of the following: a required transmission rate; a required current transmission rate; a required future transmission rate; a required reception rate; a required current reception rate; a required future reception rate; a required transmission and reception rate; a required current transmission and reception rate; a required future transmission and reception rate; a required data transmission volume; a required data reception volume; a required data transmission and reception volume; a desired radio resource; a desired current radio resource; a desired future radio resource; a desired transmission power; a desired current transmission power; a desired future transmission power; information indicating whether interference is allowed or not; information indicating whether interference is currently allowed or not; and information indicating whether interference will be allowed in the future or not.

In various embodiments, the radio communication circuit 902 may further be configured according to at least one radio communication technology of one of the following radio communication technology families:
  a Short Range radio communication technology family;
  a Metropolitan Area System radio communication technology family;
  a Cellular Wide Area radio communication technology family;
  a radio communication technology family which includes a radio communication technology in which the access to radio resources is provided in a random manner; and
  a radio communication technology family which includes a radio communication technology in which the access to radio resources is provided in a centrally controlled manner.

In various embodiments, the radio communication circuit 902 may further be configured according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), e.g. IEEE 802.11ac for VHT below 6 GHz and IEEE 802.11 ad for VHT at 60 GHz, a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, and Unlicensed Mobile Access (UMA, also referred to as also referred to as 3GPP Generic Access Network, or GAN standard)).

In various embodiments, a radio device (not shown) may be provided, the radio device, which may be also referred to as a wireless resource controller (WRC), may include a radio resource negotiating circuit configured to locally negotiate radio resources for one or more first radio communication devices assigned to the radio device based on a global negotiation of radio resources with one or more second radio communication devices.

In various embodiments, the LRC 900 may be configured to receive re-configuration information from a WRC. In various embodiments, the LRC 900 may be configured to, after having received reconfiguration information from a WRC, newly assign the resources. In various embodiments, the LRC 900 may be configured to, after having received reconfiguration information from a WRC, to repeat the assignment process described above.

Figure 10:
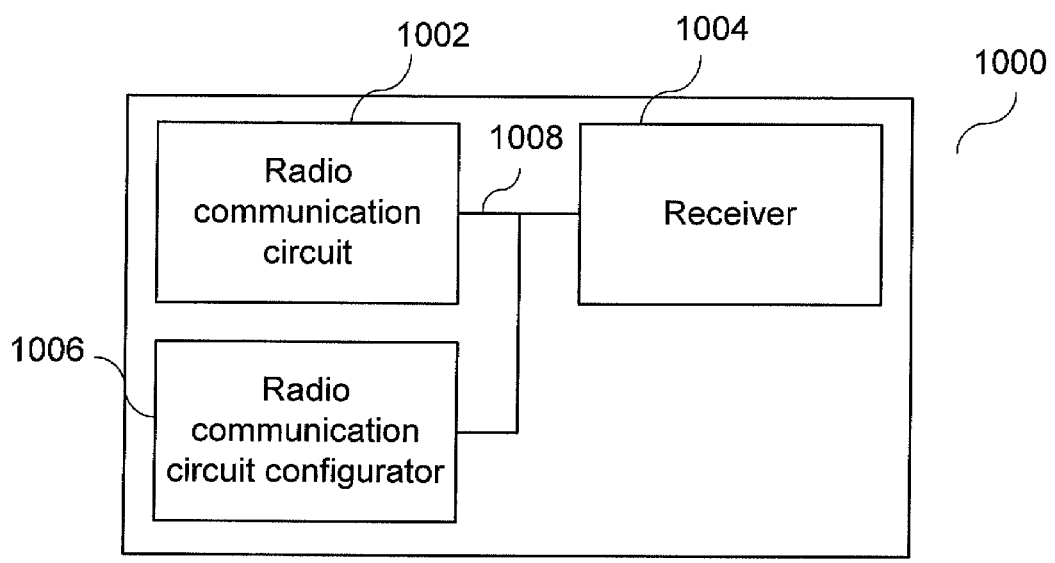
FIG. 10 shows a radio device (which may also be referred to as a local resource manager device) in accordance with an embodiment.

FIG. 10 shows a radio device 1000 (which may also be referred to as a local resource manager device or local resource controller (LRC)) in accordance with an embodiment. The radio device 1000 may include a radio communication circuit 1002; a receiver 1004 configured to receive radio resource management information; and a radio communication circuit configurator 1006 configured to dynamically (for example, in short time intervals; for example in pre-determined, fixed time intervals; for example, every time the radio configuration in the vicinity of the radio device 1000 changes; for example, every time a further radio communication device is turned on or is turned off in the vicinity of the radio device 1000) configure the radio communication circuit 1002 of the radio device 1000 based on the received radio resource management information. The radio communication circuit 1000, the receiver 1004 and the radio communication circuit configurator 1006 may be coupled with each other, e.g. via an electrical connection 1008 such as e.g. a cable or a computer bus or via any other suitable electrical connection to exchange electrical signals.

FIG. 11 shows a flow diagram 1100 illustrating a method for controlling a radio device (a wireless resource controller) in accordance with an embodiment. In 1102, a signal may be transmitted, the signal being transmitted with an intensity. In 1104, a response message to the transmitted signals may be received from a radio communication device having received the transmitted signal, the response message identifying the received message. In 1106 the reachability of the radio communication device from the radio device may be assessed based on the intensity of the signal to which the radio communication device has responded.

In various embodiments, reachability may include the distance (for example the geometric distance), the attenuation of signals, or any other metric for the positional relation between two devices. In various embodiments, reachability may include any metric involving any one of the distance (for example the geometric distance), the attenuation of signals, or any other metric for the positional relation between two devices.

In various embodiments, a plurality of signals may be transmitted, the signals being transmitted with different intensities.

In various embodiments, the signals may be provided with distinguishing features for distinguishing the intensities of the respective transmitted signals.

In various embodiments, the distinguishing features may include at least one of the following features: a transmission time of the respective signal; a transmission duration of the respective signal; a transmission frequency of the respective signal a code transmitted with the respective signal; and a Gold code transmitted with the respective signal.

In various embodiments, signals may be transmitted by broadcast.

In various embodiments, signals may be transmitted by broadcast on a dedicated channel.

In various embodiments, the transmitted signal may include an identifier of the radio device.

In various embodiments, the response message may be identical to a message transmitted by a signal of the plurality of signals.

In various embodiments, the response message may be different from a message transmitted by a signal of the plurality of signals In various embodiments, the response message may include an identifier of the received signal.

In various embodiments, the response message may include an identifier of the radio communication device.

In various embodiments, the radio communication device may be identified based on the response message.

In various embodiments, it may be assessed that the reachability of the radio communication device from the radio device is less than a pre-determined reachability, if a response to a signal transmitted with a pre-determined intensity is received.

In various embodiments, it may be assessed that the reachability of the radio communication device from the radio device is higher than a pre-determined reachability, if a response to a signal transmitted with a pre-determined intensity is not received.

In various embodiments, it may be assessed that the reachability of the radio communication device from the radio device is less than a pre-determined first reachability and higher than a pre-determined second reachability, if a response to a signal transmitted with a pre-determined first intensity is received and a response to a signal transmitted with a pre-determined second intensity is not received.

In various embodiments, one or more administrated devices which are assigned to the radio device for radio resource management may be determined.

In various embodiments, a requirement of a determined administrated device may be determined.

In various embodiments, the requirement may include a requirement of at least one of the following: a required quality of service; a required current quality of service; a required future quality of service; a required transmission rate; a required current transmission rate; a required future transmission rate; a required reception rate; a required current reception rate; a required future reception rate; a required transmission and reception rate; a required current transmission and reception rate; a required future transmission and reception rate; a required data transmission volume; a required data reception volume; a required data transmission and reception volume; a desired radio resource; a desired current radio resource; a desired future radio resource; and information indicating whether interference is allowed or not; information indicating whether interference is currently allowed or not; and information indicating whether interference will be allowed in the future or not.

In various embodiments, a self control request may be received from an administrated device indicating that the administrated device requests to control itself.

In various embodiments, a property of a determined administrated device may be determined.

In various embodiments, the property may include at least one of the following: capability of radio resources; used radio resources; currently used radio resources; future used radio resources; and requirements of one or more terminals connected to the administrated device. In various embodiments, the requirements of the one or more terminals connected to the administrated device may include at least one of the following: a required quality of service; a required current quality of service; a required future quality of service; a required transmission rate; a required current transmission rate; a required future transmission rate; a required reception rate; a required current reception rate; a required future reception rate; a required transmission and reception rate; a required current transmission and reception rate; a required future transmission and reception rate; a required data transmission volume; a required data reception volume; a required data transmission and reception volume; a desired radio resource; a desired current radio resource; a desired future radio resource; information indicating whether interference is allowed or not; information indicating whether interference is currently allowed or not; and information indicating whether interference will be allowed in the future or not.

In various embodiments, radio resources may be negotiated between a plurality of determined administrated devices.

In various embodiments, radio resources for an administrated device from which a self control request has been received may be not negotiated.

In various embodiments, radio resources may be negotiated for an administrated device with the radio communication device.

In various embodiments, radio resources may be negotiated for an administrated device with the radio communication device based on the assessed reachability of the radio communication device from the radio device.

In various embodiments, radio resources may be negotiated between a plurality of determined administrated devices based on the negotiation with the radio communication device.

In various embodiments, a plurality of radio communication devices may be classified according to the respective assessed reachability of the respective radio communication device into reachability classes.

In various embodiments, radio resources may be negotiated based on the reachability classes of the radio communication devices.

In various embodiments, the plurality of radio communication devices may be classified into two reachability classes according to the respective assessed reachability of the respective radio communication device.

In various embodiments, a radio communication device with an assessed reachability below a pre-determined threshold may be classified to be in a first reachability class, and a radio communication device with an assessed reachability above a pre-determined threshold may be classified to be in a second reachability class.

In various embodiments, radio resources may be negotiated for an administrated device with the radio communication device in the first reachability class on an exclusive usage level.

In various embodiments, a global pool (or a global set) of resources may be assigned to the radio devices.

In various embodiments, radio resources may be negotiated for an administrated device with the radio communication device in the first reachability class on a radio resource negotiation level.

In various embodiments, radio resources may be negotiated for an administrated device with the radio communication device in the second reachability class on an concurrent usage level.

In various embodiments, radio resources may be negotiated for an administrated device with the radio communication device in the second reachability class on a transmission energy negotiation level.

In various embodiments, radio resources may be negotiated for an administrated device with the radio communication device in the second reachability class on an interference avoidance level.

In various embodiments, in case interference avoidance is not possible, radio resources may be negotiated for an administrated device with the radio communication device in the second reachability class on an interference minimization level.

In various embodiments, when negotiation is not successful for a radio communication device of the second class, the radio communication device of the second class may be re-classified to be in the first class.

In various embodiments, the negotiated resources may include at least one of the following: transmission power; frequency; modulation; and time slot.

In various embodiments, the radio device may be communicate with another radio device of the same type as the radio device as a radio communication device. In other words, the radio communication device may be of the same type as the radio device.

FIG. 12 shows a flow diagram 1200 illustrating a method for controlling a radio communication device (a wireless resource controller) in accordance with an embodiment. In 1202 a signal from a radio device may be received. In 1204, the reachability of the radio communication device from the radio device may be assessed based on the received signal. In 1206, a set of information of a plurality of sets of information may be selected based on the assessed reachability. In 1208, the selected set of information may be transmitted. In 1210, one or more administrated devices which are assigned to the radio communication device for radio resource management may be determined. In 1212, radio resources may be negotiated between a plurality of determined administrated devices.

In various embodiments, the method for controlling a radio communication device may include any other feature or step of the method for controlling a radio device as described above with reference to FIG. 11.

Figure 13:
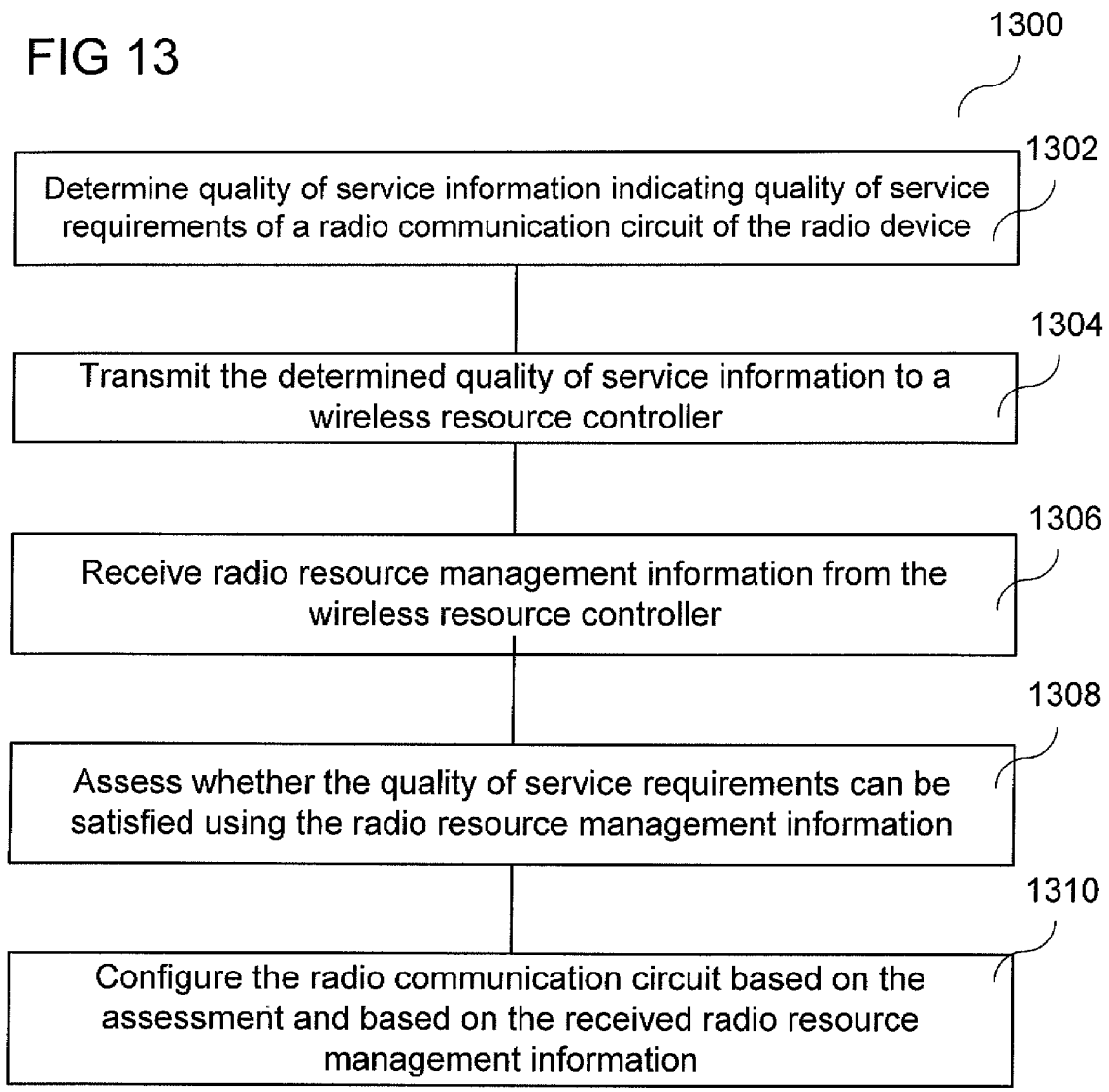
FIG. 13 shows a flow diagram illustrating a method for controlling a radio device (a local resource manager device) in accordance with an embodiment.

FIG. 13 shows a flow diagram 1300 illustrating a method for controlling a radio device (a local resource manager device) in accordance with an embodiment. In 1302, quality of service information indicating quality of service requirements of a radio communication circuit of the radio device may be determined. In 1304, the determined quality of service information may be transmitted to a wireless resource controller. In 1306, a radio resource management information from the wireless resource controller may be received. In 1308, it may be assesses whether the quality of service requirements can be satisfied using the radio resource management information. In 1310, the radio communication circuit may be configured based on the assessment and based on the received radio resource management information.

In various embodiments, the radio resource management information may represent configuration information for the radio device, for example radio resources assigned to the radio device or an algorithm to be applied in the radio device.

In various embodiments, packets may be received and a packet including radio management information may be identified based on the header of the packet.

In various embodiments, packets may be received and a packet including radio management information may be identified based on the content of the packet.

In various embodiments, exclusively radio management information may be received.

In various embodiments, the radio resource management information may include information specifying radio resources assigned to the radio device.

In various embodiments, the radio resource management information may include context information representing the radio context of the radio device.

In various embodiments, information specifying radio resources assigned to the radio device may be determined based on the context information.

In various embodiments, radio resources may be assigned based on the received radio resource management information, if the quality of service assessment circuit assesses that the quality of service requirements can be satisfied.

In various embodiments, radio resources may not be assigned, if the quality of service assessment circuit assesses that the quality of service requirements cannot be satisfied. In various embodiments, further negotiation may be carried out instead.

In various embodiments, the quality of service requirements may include at least one of the following: a required transmission rate; a required current transmission rate; a required future transmission rate; a required reception rate; a required current reception rate; a required future reception rate; a required transmission and reception rate; a required current transmission and reception rate; a required future transmission and reception rate; a required data transmission volume; a required data reception volume; a required data transmission and reception volume; a desired radio resource; a desired current radio resource; a desired future radio resource; a desired transmission power; a desired current transmission power; a desired future transmission power; information indicating whether interference is allowed or not; information indicating whether interference is currently allowed or not; and information indicating whether interference will be allowed in the future or not.

In various embodiments, a method for controlling a radio device (a wireless resource controller (WRC)) may be provided. The method may include locally negotiating radio resources for one or more first radio communication devices assigned to the radio device based on a global negotiation of radio resources with one or more second radio communication devices.

In various embodiments, the LRC may receive re-configuration information from a WRC. In various embodiments, after having received reconfiguration information from a WRC, the LRC may newly assign the resources. In various embodiments, after having received reconfiguration information from a WRC, the LRC may repeat the assignment process described above.

Figure 14:
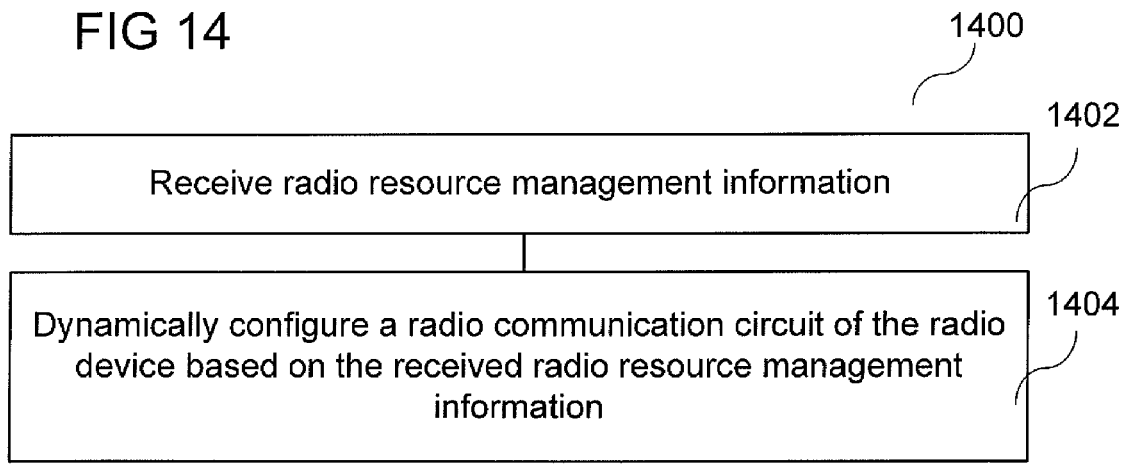
FIG. 14 shows a flow diagram illustrating a method for controlling a radio device (a local resource manager device) in accordance with an embodiment.

FIG. 14 shows a flow diagram 1400 illustrating a method for controlling a radio device (a local resource manager device) in accordance with an embodiment. In 1402, radio resource management information may be received. In 1404, the radio communication circuit of the radio device may be configured dynamically (for example, in short time intervals; for example in pre-determined, fixed time intervals; for example, every time the radio configuration in the vicinity of the radio device changes; for example, every time a further radio communication device is turned on or is turned off in the vicinity of the radio device) based on the received radio resource management information.

According to various embodiments, the following issues may be addressed:

1) Identification of neighboring Wireless Resource Controllers (WRC): A WRC may desire to acquire knowledge about neighboring WRCs. Then, the WRC may be able to contact these neighboring WRCs in order to negotiate an efficient usage of resources. In various embodiments, a method may be provided which enables a WRC to detect neighboring WRCs, even if they are operated by other operators or even if they are only deployed for a limited duration. This may be achieved by transmission of a beacon-signal that may trigger information exchange from neighboring WRCs. This beacon signal may be transmitted over the air, either by using a dedicated beacon frequency or by encapsulation onto an existing wireless standard (e.g. as payload within a WLAN frame, etc).

2) Intra-Home/Office network information exchange: Once a WRC has acquired knowledge on the neighboring WRCs, the WRCs may mutually exchange information on the home/office network they are controlling. This may concern a single-home/office environment covering systems like WLAN, ZigBee, Bluetooth, etc.

3) Inter-Home/Office resource negotiation: Once the WRC has knowledge about the operational parameters of the neighboring systems, a resource negotiation phase may be initiated in order to align the resource allocation within the multi-home/office environment. It may be desired to find an overall parameterization that may allow to minimize, avoid or even suppress interference. It is to be noted that the neighboring systems may also include neighboring macro networks as a whole.

According to various embodiments, a full framework for addressing the inter- and intra-home/office interference management may be provided.

Inter-system interference may relate to mutually interfering distinct RATs (Radio Access Technologies) operating in the same frequency band. Concerning interference within the ISM bands (for example the 2.4 GHz band, with interference between ZigBee and WiFi for example—with a particular problem related to the novel IEEE 802.11n, since the inherent large 40 MHz modes may be a challenge for ZigBee), it is commonly required that both systems are configured "by hand" such that the interference may be avoided or minimized.

Intra-system interference may relate to mutually interfering identical RATs operating in the same frequency band. The co-channel interference aspects inherent to the deployment of various WLAN Access Points (AP) commonly may be avoided by parameterization "by hand" in order to ensure a limited level of interference within a multi-AP WLAN network.

System saturation may relate to the problem of limited radio resources in a Femto-Cell deployment. At a certain number of Femto-Cells being deployed in a given area, the problem of limited resources commonly may not be resolved and a suitable parameterization of the various Femto-Cells commonly is done "by hand", for example by optimization software owned by an operator.

According to various embodiments, devices and methods for an automatic and efficient management of distinct wireless radio systems competing for resources within a given coverage area may be provided.

According to various embodiments, devices and methods may be provided for the identification of neighboring WRC and the Intra-Home/Office network information exchange. It may be assumed that a WRC may be located in a home/office. It may have partial knowledge about neighboring WRCs (for example if they are controlled by the same operator), but it may not have knowledge about the presence and parameterization of all neighboring WRCs possible. For example, the usage of mobile WRCs may lead to a highly time-variant WRC deployment and an active detection of near-by WRCs may be desired. According to various embodiments, detection of neighboring WRCs may be performed in such a way that various classes of neighboring WRCs may be distinguished.

In various embodiments, the following classes may be considered:

1) (Close-By) Neighboring WRC desiring active resource sharing: Neighboring WRCs (and related intra-home/office networks) that are very close to the WRC in consideration may be assumed to desire an active management of resource. I.e. the WRC in consideration may desire to contact these close-by WRCs and to negotiate an efficient sharing of resources.

2) (Distant) Neighboring WRCs desiring mutual power control: If WRCs are potentially interfering, but positioned in greater reachability compared to the previous case, it may be assumed that an output-power control and negotiation process may be sufficient in order to limit the mutual interference.

Figure 15:
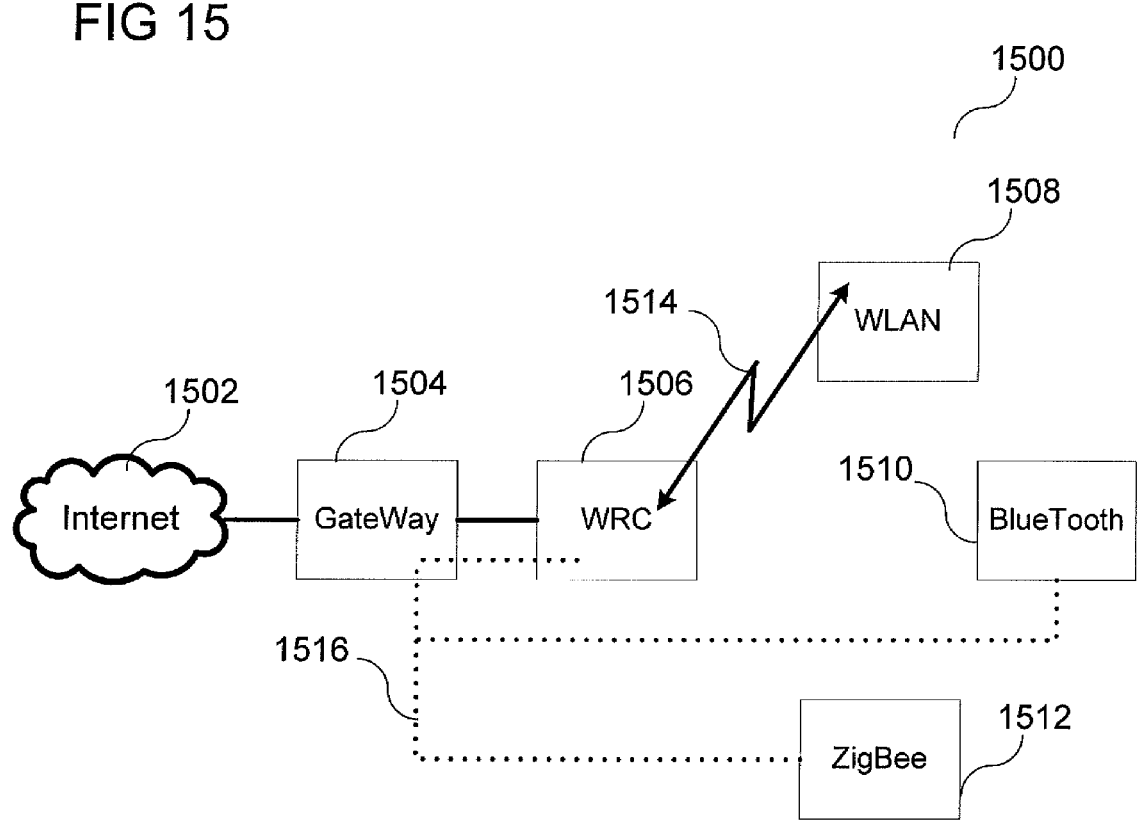
FIG. 15 shows a deployment scenario of a wireless resource controller in accordance with an embodiment.

FIG. 15 shows a deployment scenario 1500 of a wireless resource controller 1506 in accordance with an embodiment. The intra-home/office control by the WRC of the various (for example short-range, etc.) devices, for example a WLAN RAT 1508, a Bluetooth RAT 1510 and a ZigBee RAT 1512, within the home/office environment may be controlled over-the-air (typically, with the WRC supporting the RAT standard for over-the-air-transmissions for the concerned devices), for example over the over-the-air-interface 1514, or via cable, for example over the cabled link 1516. The cabled approach may be typically fed through the internet-Gateway 1504 (it may be inherently assumed that all wireless devices inside a single home/office may be connected to the same Gateway 1504). The gateway 1504 may be connected to the Internet 1502.

Figure 16:
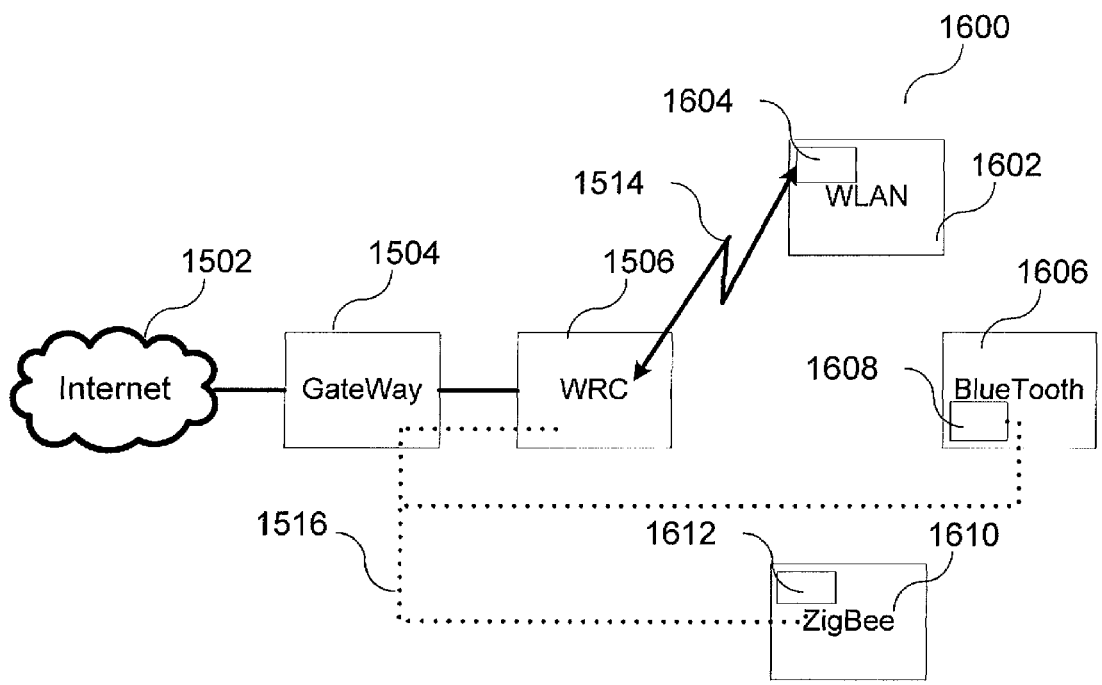
FIG. 16 shows a scenario of a wireless resource controller communicating with local resource controllers within home/office devices in accordance with an embodiment.

FIG. 16 shows a scenario 1600 of a wireless resource controller communicating with local resource controllers within home/office devices. The basic layout of the system of the scenario 1600 is similar to the scenario 1500 of FIG. 15, and duplicate description of similar devices is therefore omitted.

According to various embodiments, the applied scheme does not require any modifications to existing standards. According to various embodiments, it may be desired that a local resource manager device or a local resource controller (LRC) may be added to existing device implementations (WLAN, BlueTooth, etc.) in order to i) interact with the WRC and ii) to perform the management of the over-the-air resources locally within the devices following the restrictions imposed by the WRC. The LRC may be added to the upper control chain as illustrated in FIG. 16. The WLAN RAT 1602 may be provided with a WLAN LRC 1604, the BlueTooth RAT 1606 may be provided with a BlueTooth LRC 1608, and the ZigBee RAT 1610 may be provided with a ZigBee LRC 1612. Each of the LRCs 1604, 1608, 1612 of the WLAN RAT 1606, of the BlueTooth RAT 1606 and the ZigBee RAT 1610 may be interchanging information with the WRC 1506.

In various embodiments, the LRC may be implemented in an existing wireless landscape in at least one of the following ways:

1) According to various embodiments, the LRC may be implemented by only the update of the firmware of existing access point/base station (AP/BS) devices: The data targeting the various LRCs may be encapsulated onto the radio channels (e.g., using ZigBee frames for a ZigBee LRC, using Bluetooth frames for a BlueTooth LRC, using WiFi frames for a WiFi LRC, etc.). The frames carrying LRC data may be marked as a new type, e.g. in the corresponding header bits of a frame. Then, the new firmware of an AP/BS may detect the corresponding frames, may extract the data and may deliver the data to the newly installed LRC software. Then, the LRC software may exploit the corresponding context and/or resource selection constraints information and may adapt the internal resource management correspondingly. The LRC information may impose the exclusion of some frequency bands that shall be reserved for other Radio Access Technologies (RATs). The usage of the air interface may be limited to given time slots.

2) According to various embodiments, the LRC may be implemented in a way similar to the way described above, however, the LRC may have a specific target address (typically, an IP (Internet Protocol) address) and the information may be routed automatically to the LRC within the AP/BS by identification of the LRC address. The data may then be transported over the air or by a wired link.

3) According to various embodiment, the LRC may be implemented for using a dedicated control channel (for example a Cognitive Pilot Channel (CPC)). The LRC may include a novel receiver which may be tuned to the carrier frequency of the dedicated control channel. It may extract the corresponding information.

In various embodiments, the LRC may perform radio resource management (RRM). In various embodiments, radio resource management may involve strategies and algorithms for controlling parameters such as transmit power, channel allocation, handover criteria, modulation scheme, error coding scheme, etc. The objective may be to utilize the limited radio spectrum resources and radio network infrastructure as efficiently as possible. RRM may concern multi-user and multi-cell network capacity issues, rather than point-to-point channel capacity. Channel coding and source coding with a single user may be considered, although it may not be possible to achieve the maximum channel capacity when several users and adjacent base stations share the same frequency channel. Efficient dynamic RRM schemes may increase the system capacity in an order of magnitude, which may be more than what is possible by introducing advanced channel coding and source coding schemes. RRM may be especially important in systems limited by co-channel interference rather than by noise, for example cellular systems and broadcast networks homogeneously covering large areas, and wireless networks consisting of many adjacent access points that may reuse the same channel frequencies.

According to various embodiments, a WRC may perform the process of detecting neighboring WRCs by the following steps:

I) The WRC may broadcast a "beacon" signal including for example:

a) a "Beacon-ID";

b) a time-stamp;

c) communication parameters of the broadcasting WRC (such as an IP address, etc.);

d) Indicating resources usage approach for return-link, if target nodes need to send an answer (typically leading to an avoidance of "uplink interference"), this may for example be resolved by an adapted CSMA (Carrier Sense Multiple Access) approach or similar;

e) a digital "detection sequence" enabling neighboring WRC to detect the beacon signal. In case of "physical detection" of the beacon signal, a sequence with good auto-correlation properties may used, such as a sequence of the Gold Code family. In case of a "virtual" beacon that is broadcasted over an existing link, such a detection sequence may not be required.

This "beacon" signal may be broadcasted on a dedicated channel. Alternatively, it may be incorporated in the frame of another system, such as WLAN, etc. Also, a "virtual" transmission is possible by including the beacon in the payload of a suitable Radio Access Technology (RAT). The principle will be illustrated below.

This first beacon may be broadcasted in such a way that only the first class of neighboring WRC ("(Close-By) Neighboring WRCs desiring active resource sharing") is able to decode the signal. For example, this may be achieved by suitably choosing the output power of the beacon signal. This will be illustrated with reference to FIG. 17.

Figure 17:
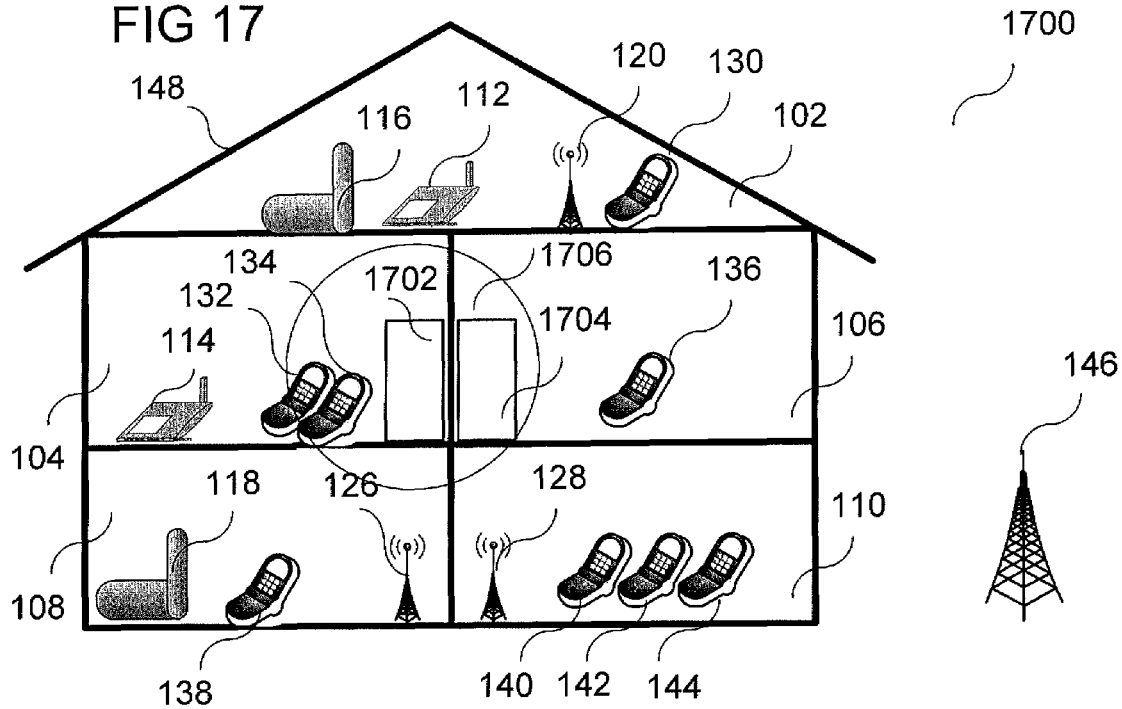
FIG. 17 shows a scenario of a beacon-broadcast for detection of close-by wireless resource controllers in accordance with an embodiment.

FIG. 17 shows a scenario 1700 of a beacon-broadcast for detection of close-by wireless resource controllers in accordance with an embodiment. The basic layout of the scenario 1700 is the same as in FIG. 1, and a repeated explanation thereof is omitted. In the scenario 1700, in the second room 104, a first wireless resource controller 1702 may be provided. In the third room 106, a second wireless resource controller 1704 may be provided.

It is to be noted that the first wireless resource controller 1702 is shown in FIG. 17 in a location where in FIG. 1 the second femto-cell base station 122 is located, and that the second wireless resource controller 1704 is shown in FIG. 17 in a location where in FIG. 1 the third femto-cell base station 124 is located. It furthermore is to be noted, that although a wireless resource controller may be provided in a common device with a femto-cell base station, this is not required, i.e. a wireless resource controller may be provided as a separate device (i.e. as a stand-alone device) in accordance with various embodiments.

In the scenario 1700, it may be assumed that the first wireless resource controller 1702 broadcasts a beacon, for example a beacon (i.e. a beacon signal) with a first intensity. In the scenario 1700, it may be furthermore assumed that the intensity of the broadcasted beacon signal is such, that the coverage of the transmitted beacon signal is the coverage area 1706. Thus, the second wireless resource controller 1704 may receive the beacon signal, and the first wireless resource controller 1702 may recognize the second wireless resource controller 1704 as a (close-by) neighboring WRC by a response of the second wireless resource controller 1704 to the first wireless resource controller 1702.

In various embodiments, optionally, the WRC which is transmitting the beacon may inform WRC owners (typically operators) that a beacon will soon be transmitted in a given area. Then, the WRC owners may activate the beacon-detection procedure in the concerned WRC.

II) Neighboring WRCs may detect and decode the beacon signal. They may use the communication parameters included in the beacon in order to communicate for example the following data to the WRC that has transmitted the beacon (for example by sending the data via the backbone using IP):

a) The "Beacon-ID" of the received beacon;
b) Communication parameters (such as the IP address) of the WRC which has received the beacon;
c) Parameterization of the intra-home/office network the concerned WRC is controlling.

III) The WRC that has transmitted the beacon may transmit a second beacon (in various embodiment with choosing a different beacon-ID). A second class of neighboring WRC ("(Distant) Neighboring WRC desiring mutual power control") may be covered, as will be illustrated with reference to FIG. 18 below.

Figure 18:
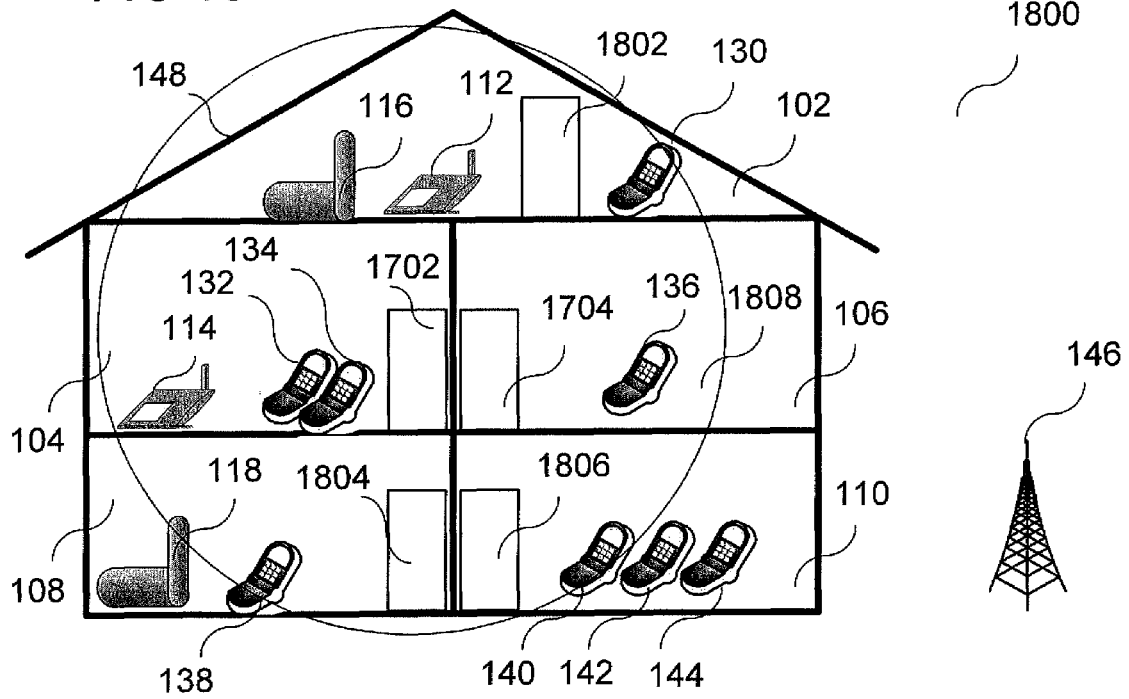
FIG. 18 shows a scenario of a beacon-broadcast for detection of distant wireless resource controllers in accordance with an embodiment.

FIG. 18 shows a scenario 1800 of a beacon-broadcast for detection of distant wireless resource controllers in accordance with an embodiment. The basic layout of the scenario 1800 is the same as in FIG. 17, and a repeated explanation thereof is omitted. In the scenario 1800, in the first room 102, a third wireless resource controller 1802 may be provided. In the fourth room 108, a fourth wireless resource controller 1804 may be provided. In the fifth room 110, a fifth wireless resource controller 1806 may be provided.

It is to be noted that the wireless resource controllers are shown in FIG. 18 in locations where in FIG. 1 second femto-cell base stations are located. It furthermore is to be noted, that although a wireless resource controller may be provided in a common device with a femto-cell base station, this is not required, i.e. a wireless resource controller may be provided as a separate device (i.e. as a stand-alone device).

In the scenario 1800, it may be assumed that the first wireless resource controller 1702 broadcasts a beacon, for example a beacon (i.e. a beacon signal) with a second intensity. In the scenario 1800, it may be furthermore assumed that the intensity of the broadcasted beacon signal is such, that the coverage of the transmitted beacon signal is the coverage area 1808. Thus, the second wireless resource controller 1704, the third wireless resource controller 1802, the fourth wireless resource controller 1804 and the fifth wireless resource controller 1806 may receive the beacon signal. The first wireless resource controller 1702, after having determined that the second wireless resource controller 1704 is a (close-by) neighboring WRC as described with reference to FIG. 17 above, may determine that the third WRC 1802, the fourth WRC 1804 and the fifth WRC 1806 are (distant) neighboring WRCs by responses of the third WRC 1802, the fourth WRC 1804 and the fifth WRC 1806.

In accordance with various embodiments, in order to differentiate beacon signals targeting "Close-By" and "Distant" neighboring BS, a different "detection sequence" may be used, e.g. by selection of different code sequences from the "Gold Code" family. Alternatively, the type indication may be performed within the beacon pay-load.

IV) Neighboring WRC may detect and may decode the second beacon signal. They may use the communication parameters contained in the beacon in order to communicate for example the following data to the WRC that has transmitted the beacon (for example by sending the data via the backbone using IP):

a) The "Beacon-ID" of the received beacon;
b) Communication parameters (such as the IP address) of the WRC which has received the beacon;
c) Parameterization of the intra-home/office network the concerned WRC is controlling.

In accordance with various embodiments, following the upper procedure, the detection of neighboring WRC may be performed.

In various embodiments, after detecting the (neighboring), possibly interfering, WRCs, their further knowledge may be acquired. For example, the multipath channel and interference characteristic of the neighboring interferers may be estimated, e.g. using the beacon. In this case, the corresponding interference may be suppressed at receiver, e.g. by using interference cancellation techniques, so that throughput and/or transmission quality of the system may be increased. In general, the more and the more accurate the information about the interferers, the bigger the improvement may be.

In various embodiments, by further exchanging the information such as the channel and interference characteristic among involved WRCs, advanced cooperative communication techniques like pre-coding, multi-user MIMO (Multiple input, multiple output), as well network MIMO may be employed. As such, higher throughput and/or transmission quality of the involved systems may be achieved. The interference cancellation and cooperative communication methods may be applied for both intra- and inter-home/offices networks. The cooperative communication concept may be used in scenarios, such as an intra-home/office network where the FC-BS's may be densely located and they may be coordinated.

According to various embodiments, inter-home/office resource negotiation may be provided as a direct following up of the detection of neighboring WRCs as detailed above.

In accordance with various embodiments, based on the above described procedure, the considered WRC may have at least the following knowledge:

a) Presence of neighboring WRCs ("close-by" and "distant" ones);

b) Communication parameters (such as the IP address) of the neighboring WRCs; and c) Parameterization of the intra-home/office networks the neighboring WRCs are controlling.

In accordance with various embodiments, the resource usage negotiation may start with the "distant" neighboring WRCs as follows:

i) The WRCs that originally initiated the broadcast of the beacon may propose a maximum output power level to each "distant neighboring WRCs". The maximum output power may be given for all RATs managed by the WRCs, typically including cellular access, WLAN, ZigBee, Bluetooth, etc.

ii) In various embodiments, if a "distant neighboring WRC" agrees on the proposed maximum output power, the WRC that originally initiated the broadcast of the beacon may be proposed a similar maximum output level. If both agree on the proposed levels, the process may be terminated. If the proposal received from the "distant neighboring WRCs" is not acceptable, an iterative procedure may follow: The WRC that originally initiated the broadcast of the beacon may propose a different maximum output power level, may wait for the answer, etc.

iii) If no agreement on the maximum output power levels can be achieved, the concerned "distant neighboring WRC" may be considered to be a "Close-By neighboring WRC" and the resource negotiation process may be handled as detailed below.

In accordance with various embodiments, when the negotiation process with the "distant neighboring WRC" is finalized, the negotiation may start with "Close-By neighboring WRCs"—with the initial objective to fully avoid interference, as detailed below:

i) The WRC that originally initiated the broadcast of the beacon may propose radio resource sharing strategies for the whole intra-home/office network that is managed by the concerned WRCs (for example, this includes cellular access, WLAN, ZigBee, Bluetooth, etc.). These resource sharing strategies may include proposals on i) spectrum usage (i.e. sharing of frequencies such that neighboring systems may operate on distinct bands), ii) time slot usage (sharing of time slots in the same band, such that neighboring systems may operate on identical bands, but occupy these bands at distinct periods in time), iii) transmit power usage, iv) proposal on the shut-down of some RATs (i.e. if one neighboring home/offices operates a multitude of systems occupying the 2.4 GHz band, it may be proposed to shut-down one of these in order to liberate resources), etc.

ii) In accordance with various embodiments, if a "distant neighboring WRC" agrees on the proposed resource sharing strategies, the WRC that originally initiated the broadcast of the beacon may be proposed a similar resource sharing strategy. If both agree on the proposed resource sharing strategies, the process may be terminated. If the proposal received from the "distant neighboring WRC" is not acceptable, an iterative procedure may follow: The WRC that originally initiated the broadcast of the beacon may propose a different resource sharing strategy, may wait for the answer, etc.

iii) If no agreement is found that may lead to the avoidance of interference, the objective may be changed from "interference avoidance" to "interference minimization" as well as "interference suppression". Then, the negotiation may be started again from step i).

In accordance with various embodiments, a specific RAT (e.g. WLAN, ZigBee, etc.) may request from the Femto-Cell BS that it desires to take control for itself or take control over a network it controls (e.g. a central WLAN node may ask to control all WLAN resource allocation mechanisms). Then, a negotiation process may be started in order to determine whether this may be granted and to which extend it may be granted.

In accordance with various embodiments, the above described procedures may address the problem of interference management in a heterogeneous multi-home/office environment, for example intra- and inter-home/office management of a heterogeneous wireless environment.

In accordance with various embodiments, a WRC may be provided in order to avoid, limit as well suppress interference with other neighboring systems, performing the following operations:

1) The considered WRC may start the detection process in order to acquire knowledge about neighboring WRC and the wireless system they are managing;

2) With the acquired knowledge, the considered WRC may start negotiating the maximum output power levels with "distant neighboring WRCs";

3) With the acquired knowledge, the considered WRC may start negotiating the resource sharing strategies with "close-by neighboring WRCs";

4) The considered WRC may operate its intra-home/office network in accordance to the negotiated output power levels and resource sharing strategies. This may result in an interference-free operation in the best case; otherwise the interference levels may be minimized.

Figure 19:
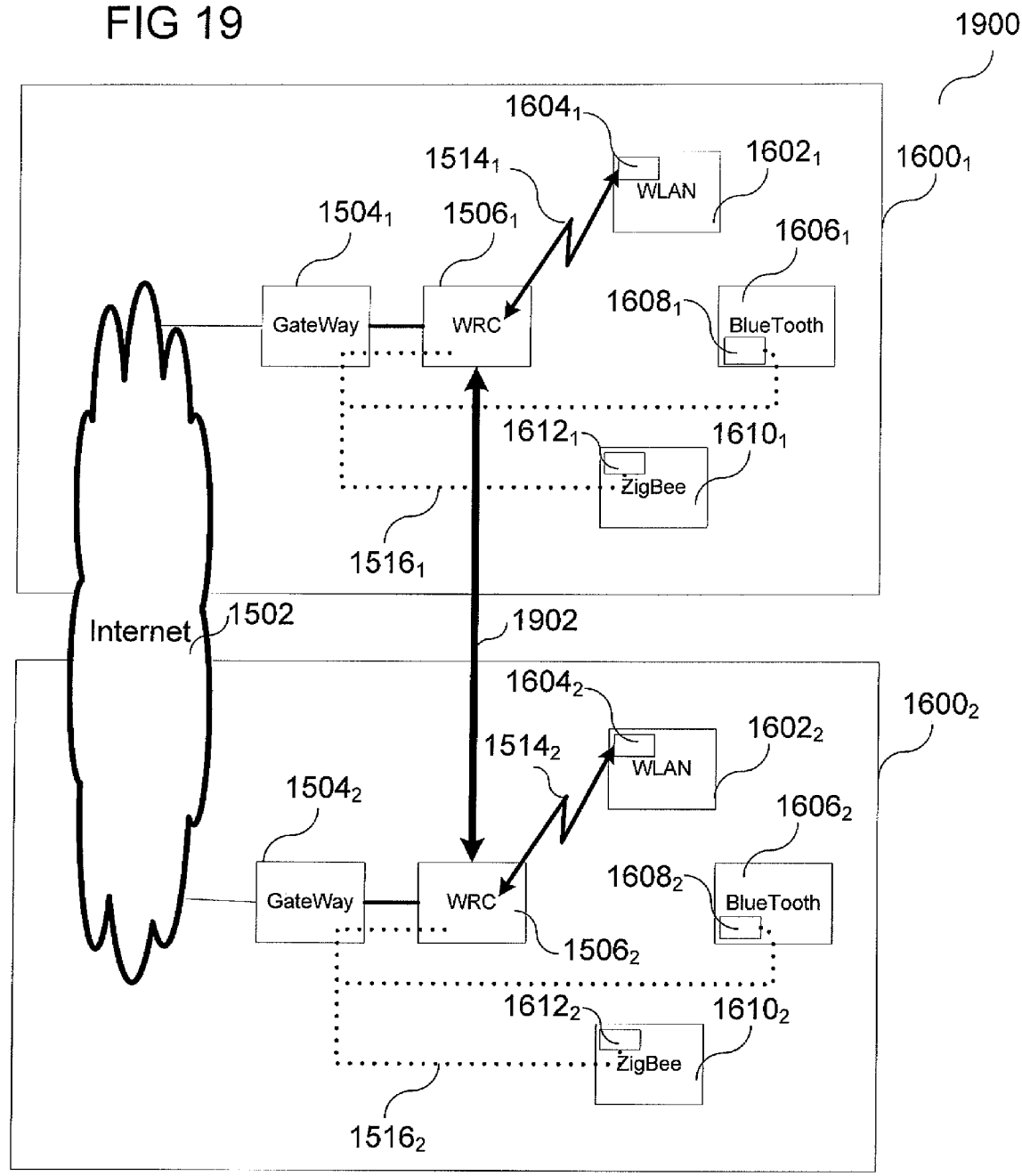
FIG. 19 shows a scenario of neighboring wireless resource controllers establishing a physical or virtual link and negotiating resource usage according to an embodiment.

FIG. 19 shows a scenario 1900 of neighboring wireless resource controllers establishing a physical or virtual link and negotiating resource usage according to an embodiment. In the scenario 1900, a first home/office $1600_1$ is provided with a wireless resource controller $1506_1$, and a second home/office $1600_2$ is provided with a wireless resource controller $1506_2$. The layout of the radio devices in the first home/office $1600_1$ and in the second home/office $1600_2$ is similar to the layout 1600 shown in FIG. 16, and duplicate description is omitted, but reference signs are provided with an index 1 for the devices of the layout 1600 of FIG. 16 in the first home/office $1600_1$ and reference signs are provided with an index 2 for the devices of the layout 1600 of FIG. 16 in the second home/office $1600_2$.

In accordance with various embodiments, the first wireless resource controller $1506_1$ may negotiate with the second wireless resource controller $1506_2$, as indicated by arrow 1902.

In accordance with various embodiments, the local resource controllers of the radio communication devices may interface a specific device implementation (WLAN, Bluetooth, etc.) with the wireless resource controller. The typical tasks are:

1) Reception of resource usage constraints from WRC, such as a) General band usage restrictions (for example, only parts of a given band may be allowed to be occupied);

b) Time restrictions (for example, information about when a device may be allowed to transmit, such that interference may be avoided or reduced);

2) Implementation-specific control of devices such that resource usage constraints may be met. This may include a vendor-specific interaction of the LRC with the lower layers (typically, the MAC (medium access control) layer) of the concerned devices.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio device comprising:
a signal transmitter to transmit a signal with an intensity;
a response receiver to receive a response message to the transmitted signal from a radio communication device having received the transmitted signal, the response message to identify the received message;
an assessment circuit to assess a reachability of the radio communication device from the radio device based on the intensity of the signal to which the radio communication device has responded, the reachability being a metric for the positional relation between devices;
a reachability classification circuit to classify a plurality of radio communication devices according to respective assessed reachability of the respective radio communication device into reachability classes;
a radio resource global negotiation circuit to negotiate radio resources based on the reachability classes of the radio communication devices;
an administrated devices determination circuit to determine one or more administrated devices which are assigned to the radio device for radio resource management,
wherein the radio resource global negotiation circuit is further to negotiate radio resources for an administrated device with the radio communication device.

2. The radio device of claim 1, wherein the signal transmitter is further to transmit a plurality of signals with different intensities.

3. The radio device of claim 1, wherein the metric for positional relation between devices includes at least one of a distance, a geometric distance, an attenuation of signals, a positional relation including the distance, a positional relation including a geometric distance, or a positional relation including an attenuation of signals.

4. The radio device of claim 3, wherein the signal transmitter is further to provide at least one signal with at least one distinguishing feature, the distinguishing feature for distinguishing an intensity of a transmitted signal.

5. The radio device of claim 1, wherein the transmitted signal comprises an identifier of the radio device.

6. The radio device of claim 1, wherein the response message includes an identifier of the received signal.

7. The radio device of claim 1, wherein the assessment circuit is further to assess that the reachability of the radio communication device from the radio device is less than a predetermined reachability, if a response to a signal transmitted with a predetermined intensity is received.

8. The radio device of claim 1, further comprising: a requirement determination circuit configured to determine a requirement of a determined administrated device.

9. The radio device of claim 8, further comprising:
a self-control request reception circuit to receive a self-control request from an administrated device indicating that the administrated device requests to control itself.

10. The radio device of claim 1, further comprising: a radio resource local negotiation circuit to negotiate radio resources between a plurality of determined administrated devices.

11. The radio device of claim 9, further comprising:
a radio resource local negotiation circuit to negotiate radio resources between a plurality of determined administrated devices;
wherein the radio resource local negotiation circuit does not negotiate radio resources for an administrated device from which a self-control request has been received.

12. The radio device of claim 1, wherein the reachability classification circuit is further to classify a radio communication device with an assessed reachability below a predetermined threshold into a first reachability class, and to classify a radio communication device with an assessed reachability above a predetermined threshold into a second reachability class.

13. The radio device of claim 1, wherein the reachability classification circuit is further to classify a radio communication device with an assessed reachability below a predetermined threshold into a first reachability class, and to classify a radio communication device with an assessed reachability above a predetermined threshold into a second reachability class; wherein the radio resource global negotiation circuit is further to negotiate radio resources for an administrated device with the radio communication device in the first reachability class on an exclusive usage level.

14. The radio device of claim 1, wherein the reachability classification circuit is further to classify a radio communication device with an assessed reachability below a predetermined threshold into a first reachability class, and to classify a radio communication device with an assessed reachability above a predetermined threshold into a second reachability class; wherein the radio resource global negotiation circuit is further to negotiate radio resources for an administrated device with the radio communication device in the second reachability class on a concurrent usage level.

15. The radio device of claim 1, wherein the reachability classification circuit is further to classify a radio communication device with an assessed reachability below a predetermined threshold into a first reachability class, and to classify a radio communication device with an assessed reachability above a predetermined threshold into a second reachability class; wherein the radio resource global negotiation circuit is further to negotiate radio resources for an administrated device with the radio communication device in the second reachability class on an interference avoidance level.

16. The radio device of claims 15, wherein the radio resource global negotiation circuit is further to, in case interference avoidance is not possible, negotiate radio resources for an administrated device with the radio communication device in the second reachability class on an interference minimization level.

17. The radio device of claim 12, wherein, when negotiation is not successful for a radio communication device of the second class, the radio communication device of the second class is re-classified to be in the first class.

* * * * *